US012811516B2

(12) United States Patent
Fatma et al.

(10) Patent No.: US 12,811,516 B2
(45) Date of Patent: Nov. 24, 2026

(54) THIN AND CONFORMABLE SPRAYED-PROCESSED TRIBOELECTRIC NANOGENERATOR (TENG) BASED ON POLYSACCHARIDES FOR ELECTRONIC SKIN APPLICATIONS

(71) Applicant: Khalifa University of Science and Technology, Abu Dhabi (AE)

(72) Inventors: Bushara Fatma, Abu Dhabi (AE); Charalampos Pitsalidis, Abu Dhabi (AE); Blaise Leopold Tardy, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 190 days.

(21) Appl. No.: 18/762,405

(22) Filed: Jul. 2, 2024

(65) Prior Publication Data

US 2026/0005625 A1 Jan. 1, 2026

(51) Int. Cl.
*H02N 1/04* (2006.01)

(52) U.S. Cl.
CPC .................................... *H02N 1/04* (2013.01)

(58) Field of Classification Search
CPC ........................................................ H02N 1/04
USPC .................................................. 310/309, 310
See application file for complete search history.

(56) References Cited

U.S. PATENT DOCUMENTS

2018/0013358 A1* 1/2018 Turng ...................... H02N 1/04

FOREIGN PATENT DOCUMENTS

CN 109586608 * 4/2019

* cited by examiner

*Primary Examiner* — Ahmed Elnakib
(74) *Attorney, Agent, or Firm* — Kilpatrick Townsend & Stockton LLP

(57) ABSTRACT

Provided herein is a triboelectric nanogenerator comprising a substrate layer; an electrode layer; and a tribolayer; wherein the electrode layer and the tribolayer are bonded to each other by hydrogen bonds. Also provided herein is a biopolymer-based triboelectric nanogenerator, comprising a first component having a positive tribolayer; and a second component having a negative tribolayer, wherein each of the first component and the second component comprise a substrate layer; an electrode layer; and a tribolayer; wherein the electrode layer and the tribolayer of the first component are bonded by hydrogen bonds. Further provided herein is a method of making a biopolymer-based triboelectric nanogenerator.

21 Claims, 27 Drawing Sheets

THIN AND CONFORMABLE SPRAYED-PROCESSED TRIBOELECTRIC NANOGENERATOR (TENG) BASED ON POLYSACCHARIDES FOR ELECTRONIC SKIN APPLICATIONS

CROSS-REFERENCES TO RELATED APPLICATIONS

This application claims priority to Greek application No. 20240100463 filed Jun. 26, 2024, the entire content of which is hereby incorporated for all purposes in its entirety.

BACKGROUND

In recent years, wearable and implantable technology have become popular. Triboelectric Nanogenerators (TENGs) in particular have recently received attention as devices for converting mechanical energy from the ambient atmosphere to electricity or as devices that may even be used for transforming mechanical energy from normal human actions (e.g., walking or tapping) into electrical energy. However, generally synthetic thick metals and polymers are used to construct most TENGs which renders them unsuitable for wearables and implants where flexibility and conformability are essential. Alternatively, dip coating has also been reported as a method of making layer-by-layer self-assembled polymeric TENGs, however, dip coating provides a limited level of control over coating thickness which hinders material flexibility and conformability. Further, dip-coating is also limited to small and simple shape objects and cannot be used to cover complex large surfaces and geometries. A need therefore exists for TENGs and methods of making TENGs that 1) have a thinner overall structure to improve the TENGs suitable flexibility and conformability, 2) can be used in large surfaces with a wide range of geometries making them more broadly commercially and industrially applicable, and 3) which are economic, time-efficient, and material efficient.

BRIEF SUMMARY

Provided herein is a triboelectric nanogenerator comprising a single substrate layer; a single electrode layer; and a single tribolayer; wherein the electrode layer and the tribolayer are bonded to each other by hydrogen bonds.

Also provided herein is a biopolymer-based triboelectric nanogenerator, comprising a first component having a positive tribolayer; and a second component having a negative tribolayer, wherein each of the first component and the second component comprise a substrate layer; an electrode layer; and a tribolayer; wherein the electrode layer and the tribolayer of the first component are bonded to each other by hydrogen bonds.

Further provided herein is a method of making a biopolymer-based triboelectric nanogenerator comprising spray-coating a substrate with an electrode layer; and spray-coating the electrode layer with a tribolayer, wherein the spray-coating of the electrode layer does not exceed 80 passes and wherein the spray-coating of the tribolayer does not exceed 240 passes.

The details of one or more embodiments are set forth in the drawings and the description below. Other features, objects, and advantages will be apparent from the description and drawings, and from the claims.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
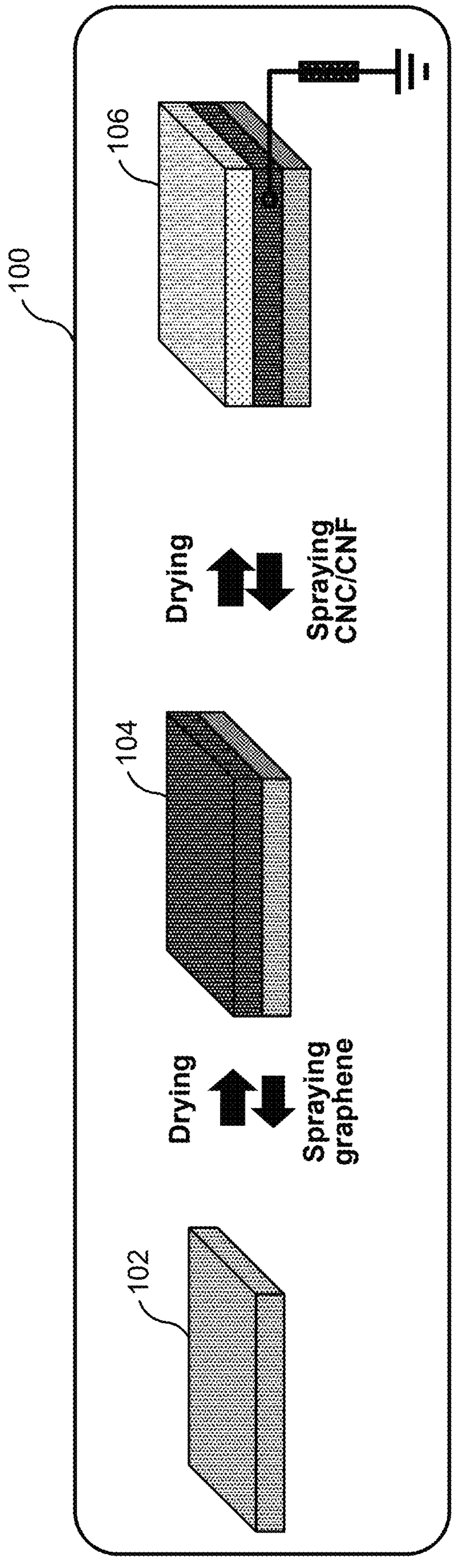
FIG. 1: Schematic representation of skin-like TENG preparation composed of an agar layer (A), a graphene layer ($G_{40}$), and a nanocellulose ($NC_{80}$) layer wherein 40 and 80 represents the number of spray passes that make up each layer, in accordance with embodiments of the disclosure.

Before the present disclosure is described in detail, it is to be understood that the terminology used herein is for purposes of describing particular examples and embodiments only and is not intended to be limiting.

In this specification and in the claims that follow, reference will be made to a number of terms that shall be defined to have the following meanings:

As used herein, the terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein, the term "about" refers to a value including 10% more than the stated value and 10% less than the stated value.

As used herein, the term "ultrathin" refers to a layer thickness of less than 30 μm.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition, in a description of a method, or in a description of elements of a device, is understood to encompass those compositions, methods, or devices consisting essentially of and consisting of the recited components or elements, optionally in addition to other components or elements. The invention illustratively described herein suitably may be practiced in the absence of any element, elements, limitation, or limitations which is not specifically disclosed herein.

Unless defined otherwise, all technical and scientific terms used herein have the same meaning as commonly understood by one of ordinary skill in the art to which this invention belongs. Although, any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

The present disclosure is directed to triboelectric nanogenerators (TENGs) that are formed by multiple spray coating passes of the electrode layer and the tribolayer. While layer-by-layer self-assembled polymeric TENGs have previously been made using a dip-coating technique, the disadvantages of the technique limit its applicability. While dip-coating provides a limited level of control over coating thickness, it is limited to small and simple shape objects. To overcome these limitations, spray coating is a viable alternative. Spray coating is a technique generally used in the preparation of ultrathin films. Spray coating is a versatile and precise method for depositing thin films of materials onto various substrates. The technique involves the atomization of a liquid solution or suspension into fine droplets, which are then directed onto a substrate surface. The even distribution of these droplets ensures uniform coverage, making it ideal for creating ultrathin layers in the nanometer scale. Accordingly, spray coating may be used to make layer-by-layer self-assembled ultrathin polymeric TENGs as described herein. A further advantage of spray coating is that the technique can be used to cover complex large surfaces and geometries, making it scalable for commercialization. Also, due to its quick and minimal material usage, spray coating is a cost and time-efficient technique applicable for industrialization.

As to functionality, layer-by-layer spray-coating of triboelectric components offers precise control over the thickness and the minimum composition required for high-performance TENG by controlling the interaction between graphene and nanocellulose (NC) to enhance charge separation and, therefore, charge transfer efficiency. The high level of control in making multilayer assemblies of TENGs using spray coating offers remarkable flexibility for the TENGs to conform to the contours of the human body, thereby facilitating the use of TENGs described herein in wearable and implantable device technology. Additionally, using ultrathin devices reduces the quantity of material needed and the possibility of negative effects on the human body. Therefore, the emergence of ultrathin, skin-like, devices fabricated through spray coating techniques marks a significant milestone in the evolution of wearable and implantable technologies. TENGs that are ultrathin and skin-like adhere to the natural curves of the human body, providing optimal comfort and wearability. Because these TENGs can capture mechanical energy from the user's natural motions, skin-like TENGs are a promising and energy-efficient solution for wearable electronics.

The present disclosure is directed to triboelectric nanogenerators (TENGs) operated in a dual electrode contact separation mode or TENGs operated in single electrode contact mode. When the TENG of the present disclosure is in its final application as electronic skin for sensing different materials (i.e., e-skin), it is operated in a single electrode mode. In general, the TENG may comprise a substrate layer, an electrode layer, and a tribolayer. The electrode layer may be bonded to the tribolayer by hydrogen bonding. The substrate layer and the electrode layer may be bonded by ionic bonding. In some aspects, each TENG comprises one of each layer (i.e., a single layer of the substrate, electrode, and tribolayer, respectively), with the electrode layer and the tribolayer (i.e., the triboelectric component) being formed by multiple spray coating passes.

In some aspects, the substrate layer is the base layer (i.e., the first layer), the electrode layer is the middle layer (i.e., the second layer), and the tribolayer is the surface layer (i.e., the third layer). In some aspects, the base layer may be ionically bonded to the middle layer and the middle layer may be hydrogen bonded to the surface layer.

In some aspects, the substrate layer is an agar layer. In some aspects, the agar may comprise agarose and/or agaropectin. The agarose and agaropectin may be mixed at a ratio of 60:40, 65:35, 70:30, 75:25, 80:20, 85:15, 90:10, 95:5, or 100:0. In some aspects, the agar only comprises agarose and does not contain agaropectin.

In some aspects, the electrode layer is a graphene layer. In some aspects, the tribolayer is a nanocellulose layer. The nanocellulose layer may be a never-dried cellulose nanocrystal (NDCNC), a cellulose nanofibril (CNF), a spray-dried cellulose nanocrystal (SDCNC), or a tempo-oxidized cellulose nanofibril (TOCNF). The triboelectric nanogenerator may comprise a film.

In some aspects, the tribolayer may have a thickness from 1 to 20 μm. In some aspects, the tribolayer may have a thickness from 1.5 to 20 μm. In some aspects, the tribolayer may have a thickness of at least 1.0 μm, at least 1.5 μm, at least 2.0 μm, at least 2.5 μm, at least 3.0 μm, at least 3.5 μm, at least 4.0 μm, at least 4.5 μm, at least 5.0 μm, at least 5.5 μm, at least 6.0 μm, at least 6.5 μm, at least 7.0 μm, at least 7.5 μm, at least 8.0 μm, at least 8.5 μm, at least 9.0 μm, at least 9.5 μm, at least 10.0 μm, 11.0 μm, at least 11.5 μm, at least 12.0 μm, at least 12.5 μm, at least 13.0 μm, at least 13.5 μm, at least 14.0 μm, at least 14.5 μm, at least 15.0 μm, at least 15.5 μm, at least 16.0 μm, at least 16.5 μm, at least 17.0 μm, at least 17.5 μm, at least 18.0 μm, at least 18.5 μm, at least 1 9.0 μm, at least 19.5 μm, or at least 20.0 μm. In terms of ranges, the tribolayer may have a thickness (in μm) from 1 to 20, from 1 to 19, from 1 to 18, from 1 to 17, from 1 to 16, from 1 to 15, from 1 to 14, from 1 to 13, from 1 to 12, from 1 to 11, from 1 to 10, from 1 to 9, from 1 to 8, from 1 to 7, from 1 to 6, from 1 to 5, from 1 to 4, from 1 to 3, or from 1 to 2. In some aspects, the tribolayer may have a thickness (in μm) of from 2 to 20, from 2 to 19, from 2 to 18, from 2 to 17, from 2 to 16, from 2 to 15, from 2 to 14, from 2 to 13, from 2 to 12, from 2 to 11, from 2 to 10, from 2 to 9, from 2 to 8, from 2 to 7, from 2 to 6, from 2 to 5, from 2 to 4, or from 2 to 3. In some aspects, the tribolayer may have a thickness (in μm) of from 3 to 20, from 3 to 19, from 3 to 18, from 3 to 17, from 3 to 16, from 3 to 15, from 3 to 14, from 3 to 13, from 3 to 12, from 3 to 11, from 3 to 10, from 3 to 9, from 3 to 8, from 3 to 7, from 3 to 6, from 3 to 5, or from 3 to 4. In some aspects, the tribolayer may have a thickness (in μm) of from 4 to 20, from 4 to 19, from 4 to 18, from 4 to 17, from 4 to 16, from 4 to 15, from 4 to 14, from 4 to 13, from 4 to 12, from 4 to 11, from 4 to 10, from 4 to 9, from 4 to 8, from 4 to 7, from 4 to 6, or from 4 to 5. In some aspects, the tribolayer may have a thickness (in μm) of at least 1.5, at least 2.0, at least 2.5, at least 3.0, at least 3.5, at least 4.0, at least 4.5, at least 5.0, at least 5.5, at least 6.0, at least 6.5, at least 7.0, at least 7.5, at least 8.0, at least 8.5, at least 9.0, at least 9.5, at least 10.0, at least 10.5, at least 11.0, at least 11.5, at least 12.0, at least 12.5, at least 13.0, at least 13.5, at least 14.0, at least 14.5, at least 15.0, at least 15.5, at least 16.0, at least 16.5, at least 17.0, at least 17.5, at least 18.0, at least 18.5, at least 19.0, at least 19.5, or at least 20.0.

In some aspects, the graphene layer may have a thickness of 4 μm. In some aspects, the graphene layer may have a thickness of 2 to 10 μm. In terms of ranges, the graphene layer may have a thickness (in μm) of from 2 to 10, from 2 to 9, from 2 to 8, from 2 to 7, from 2 to 6, from 2 to 5, from 2 to 4, or from 2 to 3. In some aspects, the graphene layer may have a thickness (in μm) of from 3 to 10, from 3 to 9, from 3 to 8, from 3 to 7, from 3 to 6, from 3 to 5, or from 3 to 4. In some aspects, the graphene layer may have a thickness (in μm) of from 4 to 10, from 4 to 9, from 4 to 8, from 4 to 7, from 4 to 6, or from 4 to 5. In some aspects, the graphene layer may have a thickness (in μm) of at least 2.0, at least 2.2, at least 2.4, at least 2.6, at least 2.8, at least 3.0, at least 3.2, at least 3.4, at least 3.6, at least 3.8, at least 4.0, at least 4.2, at least 4.4, at least 4.6, at least 4.8, at least 5.0, at least 5.2, at least 5.4, at least 5.6, at least 5.8, at least 6.0, at least 6.2, at least 6.4, at least 6.6, at least 6.8, at least 7.0, at least 7.2, at least 7.4, at least 7.6, at least 7.8, at least 8.0, at least 8.2, at least 8.4, at least 8.6, at least 8.8, at least 9.0, at least 9.2, at least 9.4, at least 9.6, at least 9.8, or at least 10.0. In some aspects, the graphene layer may have a thickness (in μm) of 10.0 or less, 9.8 or less, 9.6 or less, 9.4 or less, 9.2 or less, 9.0 or less, 8.8 or less, 8.6 or less, 8.4 or less, 8.2 or less, 8.0 or less, 7.8 or less, 7.6 or less, 7.4 or less, 7.2 or less, 7.0 or less, 6.8 or less, 6.6 or less, 6.4 or less, 6.2 or less, 6.0 or less, 5.8 or less, 5.6 or less, 5.4 or less, 5.2 or less, 5.0 or less, 4.8 or less, 4.6 or less, 4.4 or less, 4.2 or less, 4.0 or less, 3.8 or less, 3.6 or less, 3.4 or less, 3.2 or less, 3.0 or less, 2.8 or less, 2.6 or less, 2.4 or less, 2.2 or less, or 2.0 or less.

In some aspects, the device output voltage is greater than 500 V. In some aspects, the device output may be greater than (in V) at least 500, at least 525, at least 550, at least 575, at least 600, at least 625, at least 650, at least 675, at least 700, at least 725, at least 750, at least 775, at least 800, at least 825, at least 850, at least 875, at least 900, at least 925, at least 950, at least 975, at least 1000, at least 1025, at least 1050, at least 1075, at least 1100, at least 1125, at least 1150, at least 1175, at least 1200, at least 1225, at least 1250, at least 1275, at least 1300, at least 1325, at least 1350, at least 1375, at least 1400, at least 1425, at least 1450, at least 1475, or at least 1500. In some aspects, the device output may be (in V) 1500 or less, 1475 or less, 1450 or less, 1425 or less, 1400 or less, 1375 or less, 1350 or less, 1325 or less, 1300 or less, 1275 or less, 1250 or less, 1225 or less, 1200 or less, 1175 or less, 1150 or less, 1125 or less, 1100 or less, 1075 or less, 1050 or less, 1025 or less, 1000 or less, 975 or less, 950 or less, 925 or less, 900 or less, 875 or less, 850 or less, 825 or less, 800 or less, 775 or less, 750 or less, 725 or less, 700 or less, 675 or less, 650 or less, 625 or less, 600 or less, 575 or less, 550 or less, 525 or less, or 500 or less. In terms of ranges, the device output (in V) is from 500 to 1500, from 600 to 1500, from 700 to 1500, from 800 to 1500, from 900 to 1500, or from 1000 to 1500. In some aspects, the device output may not exceed (in V) 1200. In some aspects, the device output may not be less than (in V) 500.

The present disclosure is further directed to biopolymer-based triboelectric nanogenerators (TENGs), comprising a first component having a positive tribolayer and a second component having a negative tribolayer, wherein each of the first component and the second component comprise a substrate layer, an electrode layer, and a tribolayer. The electrode layer of the first component may be bonded to the tribolayer of the first component by hydrogen bonding. The substrate layer of the first component and the electrode layer of the first component may be bonded by ionic bonding. In some aspects, each TENG comprises one of each layer, with each layer being formed by multiple passes.

In some aspects, the for each of the first component and the second component of the biopolymer-based TENG, the substrate layer is the base layer (i.e., the first layer), the electrode layer is the middle layer (i.e., the second layer), and the tribolayer is the surface layer (i.e., the third layer). In some aspects, the base layer of the first component may be ionically bonded to the middle layer of the first component and the middle layer of the first component may be hydrogen bonded to the surface layer of the first component. Each of the base, electrode, and tribolayer may comprise more than one layer as described herein.

In some aspects, the first component is a triboelectric component. In some aspects, the substrate layer of the triboelectric component is an agar layer. The agar may comprise agarose and/or agaropectin. In some aspects, the agarose and agaropectin may be mixed at a ratio of 60:40, 65:35, 70:30, 75:25, 80:20, 85:15, 90:10, 95:5, or 100:0. In some aspects, the agar only comprises agarose and does not contain agaropectin. In some aspects, the electrode layer of the triboelectric component is a graphene layer. In some aspects the tribolayer of the triboelectric component is a nanocellulose layer. The nanocellulose layer may be a never-dried cellulose nanocrystal (NDCNC), a cellulose nanofibril (CNF), a spray-dried cellulose nanocrystal (SDCNC), or a tempo-oxidized cellulose nanofibril (TOCNF). In some aspects, the nanocellulose layer is a never-dried cellulose nanocrystal (NDCNC).

In some aspects, the second component comprises a poly(ethylene terephthalate) (PET) substrate layer, a copper (Cu) tape electrode layer, and a polyimide (PI) or castor oil (CO) tribolayer.

The present disclosure is related to methods of making biopolymer-based triboelectric nanogenerators (TENGs) comprising spray-coating a substrate with an electrode layer and spray-coating the electrode layer with a tribolayer. In some aspects, each TENG comprises one of each layer (i.e., a single substrate layer, electrode layer, and tribolayer), with the electrode layer and the tribolayer being formed by multiple passes. In some aspects the electrode layer does not exceed 80 passes. In some aspects the electrode layer is formed by 10, 15, 20, 25, 30, 35, 40, 45, 50, 55, 60, 65, 70, 75, or 80 passes. In some aspects the tribolayer does not exceed 200 passes. In some aspects the tribolayer is formed by 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or 250 passes.

Aspects of the disclosure and the invention may be further understood by reference to the following non-limiting examples.

EXEMPLARY EMBODIMENTS

Exemplary embodiments provided in accordance with the presently disclosed subject matter include, but are not limited to, the claims and the following embodiments:

Embodiment 1: A triboelectric nanogenerator comprising a single substrate layer; a single electrode layer; and a single tribolayer; wherein the electrode layer and the tribolayer are bonded to each other by hydrogen bonds.

Embodiment 2: The triboelectric nanogenerator of embodiment 1, wherein the substrate layer is the base layer, the electrode layer is the middle layer, and the tribolayer is the surface layer.

Embodiment 3: The triboelectric nanogenerator of embodiments 1 or 2, wherein the substrate layer is an agar layer.

Embodiment 4: The triboelectric nanogenerator of any one of embodiments 1-3, wherein the electrode layer is a graphene layer.

Embodiment 5: The triboelectric nanogenerator of any one of embodiments 1-4, wherein the wherein the tribolayer is a nanocellulose layer.

Embodiment 6: The triboelectric nanogenerator of embodiment 5, wherein the nanocellulose layer is a never-dried cellulose nanocrystal (NDCNC), a cellulose nanofibril (CNF), a spray-dried cellulose nanocrystal (SDCNC), or a tempo-oxidized cellulose nanofibril (TOCNF).

Embodiment 7: The triboelectric nanogenerator of any one of embodiments 1-6, wherein the tribolayer comprises a film.

Embodiment 8: The triboelectric nanogenerator of any one of embodiments 1-7, wherein the tribolayer has a thickness from 1.5 to 20 μm.

Embodiment 9: The triboelectric nanogenerator of any one of embodiments 1-8, wherein the graphene layer has a thickness from 3 to 8 μm.

Embodiment 10: The triboelectric nanogenerator of any one of embodiments 1-9, wherein the device output voltage is greater than 500 V.

Embodiment 11: A biopolymer-based triboelectric nanogenerator, comprising a first component having a positive tribolayer; and a second component having a negative tribolayer, wherein each of the first component and the second component comprise a substrate layer; an electrode layer; and a tribolayer; wherein the electrode layer and the tribolayer of the first component are bonded to each other by hydrogen bonds.

Embodiment 12: The biopolymer-based triboelectric nanogenerator of embodiment 11, wherein for each of the first component and the second component the substrate layer is the base layer, the electrode layer is the middle layer, and the tribolayer is the surface layer.

Embodiment 13: The biopolymer-based triboelectric nanogenerator of embodiments 11 or 12, where the first component is a triboelectric component.

Embodiment 14: The triboelectric component of any one of embodiments 11-13, wherein (i) the substrate layer is an agar layer; (ii) the electrode layer is a graphene layer; and (iii) the tribolayer is a nanocellulose layer.

Embodiment 15: The triboelectric component of embodiment 14, wherein the nanocellulose layer is a never-dried cellulose nanocrystal (NDCNC), a cellulose nanofibril (CNF), a spray-dried cellulose nanocrystal (SDCNC), or a tempo-oxidized cellulose nanofibril (TOCNF).

Embodiment 16: The triboelectric component of embodiment 14, wherein the nanocellulose layer is never-dried cellulose nanocrystal (NDCNC).

Embodiment 17: The biopolymer-based triboelectric nanogenerator of any one of embodiments 11-16, wherein the second component comprises a poly(ethylene terephthalate) (PET) substrate layer; a copper (Cu) tape electrode layer; and a polyimide (PI) or castor oil (CO) tribolayer.

Embodiment 18: The triboelectric component of any one of embodiments 11-17, wherein the tribolayer has a thickness from 1.5 to 20 μm.

Embodiment 19: The triboelectric component of any one of embodiments 14-18, wherein the graphene layer has a thickness from 3 to 8 μm.

Embodiment 20: The triboelectric component of any one of embodiment 11-18, wherein the device output voltage is over 500 V.

Embodiment 21: A method of making a biopolymer-based triboelectric nanogenerator comprising spray-coating a substrate with an electrode layer; and spray-coating the electrode layer with a tribolayer, wherein the spray-coating of the electrode layer does not exceed 80 passes and wherein the spray-coating of the tribolayer does not exceed 240 passes.

EXAMPLES

Example 1: Materials and Methods

Materials used in the preparation of devices were polyimide (PI) sheet and agar. All the reactants and solvents were used as received, without any further purification treatment. Ethanol (94%) and isopropyl alcohol (IPA) were used without further purification. PET sheets (MYLAR® Film Sheets).

Preparation of Different Type of Nanocellulose (NC)

The nanocelluloses (NCs) used in these examples were produced from different sources as well as different extraction processes including mechanical and chemical treatments. All NC-based samples were used as concentrated dispersions except for a spray-dried NC which was used in powder form.

Preparation of Never-Dried Cellulose Nanocrystal (NDCNC)

Never-dried cellulose nanocrystal (CAS No. 7789-20-0) were produced by dissolving wood fibers using 64 wt % sulfuric acid hydrolysis for an hour at 45 °C, followed by dilution with reverse osmosis and bleaching with sodium chlorite. The solution was further neutralized using sodium hydroxide which resulted in the formation of a thick slurry (10 wt %) after membrane filtration. These NDCNCs with typical dimensions of 5-20 nm in width and 150-200 nm in length and sulfur content of 0.95 wt % were produced in the form of suspension in water by USDA's Forest Products Laboratory (FPL, Madison, WI) and acquired through the Process Development Center (University of Maine, Orono, Maine, USA).

Preparation of Cellulose Nanofibril (CNF)

Cellulose nanofibrils (CNFs) were prepared using a microfluidization of never dried, fully bleached sulfite birch pulp (Kappa number of 1, and degree of polymerization (DP) of 4700) after washing them with 0.01 M HCl in order to filter the residual metal ions. and then with deionized (DI) water to reach a pH of 5. The fibers of the washed fibers suspension in DI water with a mass fraction of 1.8% (w/v) were disintegrated by passing them through a high-pressure fluidizer (Microfluidics M110P, Microfluidics Int. Co., Newton, MA). A homogeneous and thick gel-like suspension was obtained after the ninth pass.

Preparation of Spray-Dried Cellulose Nanocrystal (SDCNC)

Spray-dried cellulose nanocrystals (SDCNCs) used in these examples were produced at industrial scale by Cellu-Force (Montreal, Quebec), the largest producer of sulfuric acid (64 wt %) hydrolyzed cellulose nanocrystals (CNC) produced from breached Kraft pulp. After hydrolysis, the product was neutralized to its sodium form and spray dried.

Tempo-Oxidized Cellulose Nanofibril (TOCNF)

Tempo-oxidized cellulose nanofibrils were made by carboxylation of bleached birch fibers with alkaline 2,2,6,6,-tetramethylpipelidine-1-oxyl radical (TEMPO)—NaBr—NaClO. Details of synthesis and properties of tempo-oxidized cellulose nanofibril (TOCNF) have been reported but are also discussed herein. Orelma, H., Vuoriluoto, M., Johansson, L. S., Campbell, J. M., Filpponen, I., Biesalski, M., & Rojas, O. J. (2016). Preparation of photoreactive nanocellulosic materials via benzophenone grafting. RSC advances, 6(88), 85100-85106. Initially the fibers (45 g) were treated with 0.9 g of TEMPO and 21.6 g of NaBr in 4.5 L of DI water while maintaining the pH at 10 using NaOH. This was followed by addition of 13.4 g of NaOCl. During the complete oxidation process, the pH of the solution was maintained for 1.5 h. The obtained product was washed with 2.5 pH water three times by Buchner filtration and then washed with DI water (three times).

Scheme 1. Building blocks of nanocrystal and nanofibril compositions.

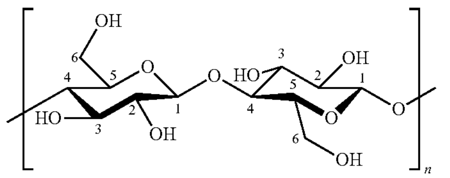

CNF

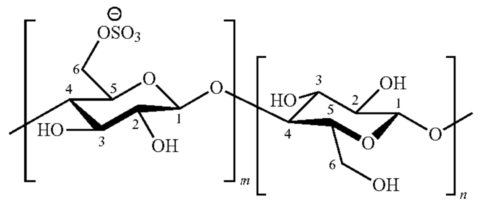

NDCNC/SDCNC

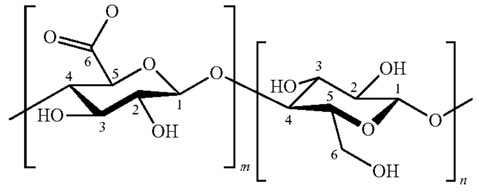

TOCNF

Example 2: Preparation of Graphene Ink

Commercial graphite with particle sizes less than 100 microns was suspended in water along with the surfactant (Sodium Dodecyl Sulfate). The final suspension was homogenized using high pressure homogenizer (PSI-30) and applied pressure was over 500 bars. The shear induced graphene were produced in the microfluidic channel by exfoliating graphite. For the preparation of few layer graphene suspension, the process was continued for several cycles ranging from 10-500 cycles. The final product was centrifuged to separate the few layer stable graphene suspended in water from exfoliated ones. Concentration of few layer graphene suspension may be between 2 g/l to 50 g/l which may be further used for spray coating.

Example 3: Preparation of Free Standing Ultrathin Nanocellulose Film ($NC_{80}$)

For the preparation of free standing ultrathin nanocellulose film ($NC_{80}$), a desired concentration of all four different types of NC were prepared. A smooth metallic substrate (Cu tape) was chosen for the easy removal of sprayed ultrathin films. Initially the Cu tape was attached to the poly(ethylene terephthalate) PET substrate and the NC suspension was sprayed onto the Cu tape. In each pass of spraying, the whole surface was covered with NC droplets and dried subsequently before the spraying the second pass. For each NC, a total of 80 passes were done for the layered deposition of NC film, until the film automatically delaminated from the substrate due to the internal strain in the film. The prepared multilayer (80) ultrathin freestanding film named $NC_{80}$ was measured to have a thickness ranging from ~5-6 μm where each layer had a thickness of about 63-75 nm. It took 20 passes for each NC to cover the surface completely as checked by the multi-meter.

Example 4: Preparation of Graphene/Nanocellulose Based Ultrathin Triboelectric Component on Hygroscopic Agar Substrate ($AG_{40}NC_{80}$)

For the preparation of the triboelectric component, ultrathin multilayers of graphene are spray coated on a hygroscopic agar substrate to serve as an electrode, followed by an ultrathin layered coating of dielectric NCs for the purpose of making a tribolayer, FIG. 1 (see also Scheme 1). FIG. 1 shows a cartoon representation of the ultrathin sprayed layered film of NC on graphene coated agar (100). Briefly, and as further described below, the free-standing film of solution casted agar (102) is sprayed with graphene to create a graphene layer (104). Following, the dried graphene layer is then sprayed with CNC/CNF to create an ultrathin sprayed layered film of nanocellulose (NC) (CNC/CNF) (106) on graphene coated agar. The ultrathin sprayed layer film of NC is subsequently allowed to dry.

Agar Substrate Preparation (A)

For the fabrication of the agar-based film, agar powder was added to DI water to make a 2 wt % mixture along with 20% glycerol with respect to the weight of agar. The whole solution was boiled in a microwave oven for 1 min, three times. A viscous solution of agar was then cooled down from approximately 130 °C to 60 °C before pouring it into a Petri dish which was then kept at 60 °C overnight to completely evaporate the water. Thus, a transparent, flexible free-standing film of agar was prepared and kept at room temperature and 50% relative humidity until used.

Ultrathin Coating of Graphene Ink on Agar ($AG_{40}$)

Figure 2:
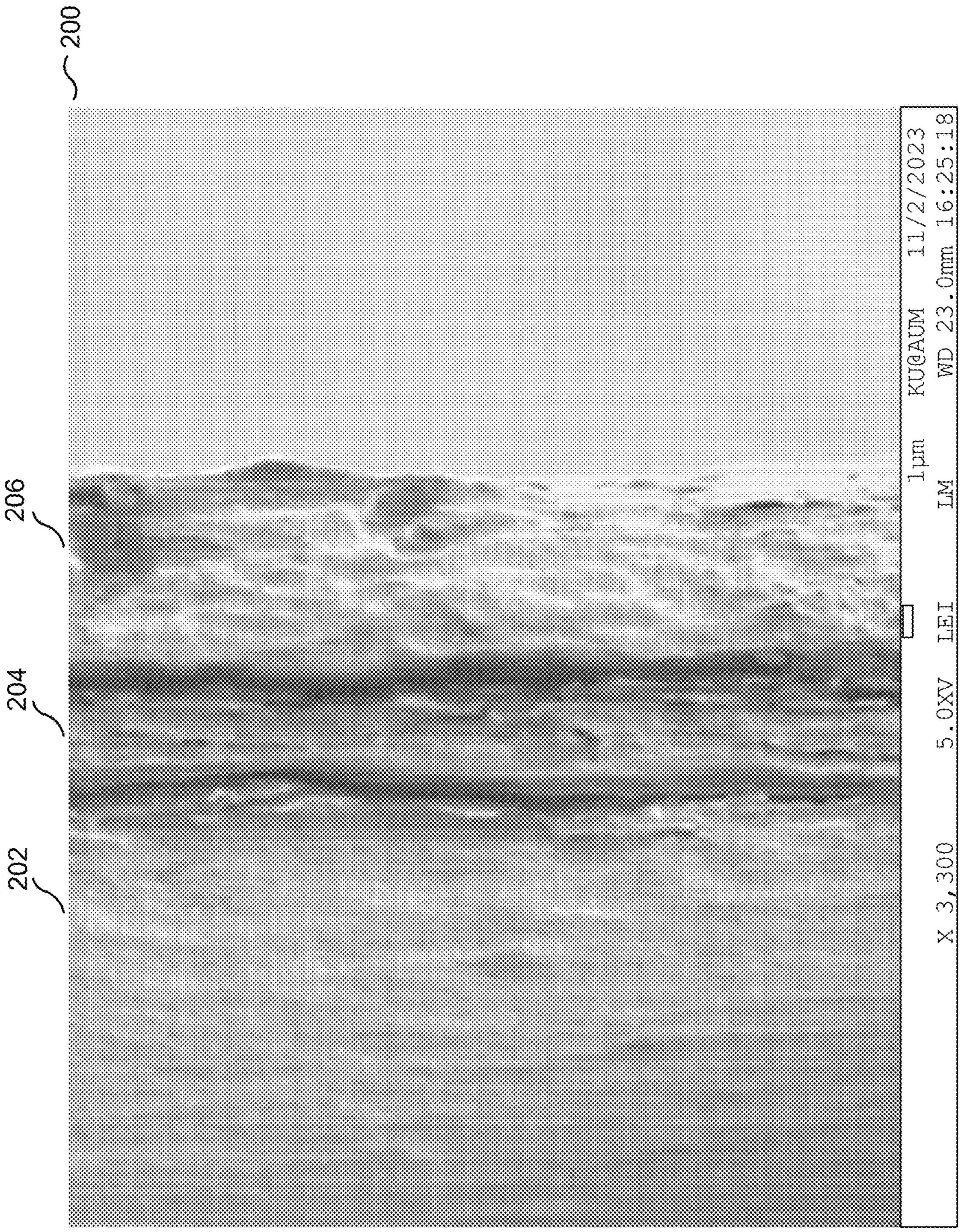
FIG. 2: Shows a field emission scanning electron microscopy (FESEM) image of a cross-section of the TENG device component ($AG_{40}NC_{80}$) composed of agar, graphene ($G_{40}$) and nanocellulose ($NC_{80}$) (from left to right) as (1) substrate, (2) electrode and (3) tribolayer, respectively, in accordance with embodiments of the disclosure.

For the preparation of ultrathin coated agar substrate, see FIG. 2, untreated agar substrates 202 were fixed onto the heating plate at 60 °C using scotch tape. Forty (40) layers of graphene were sprayed on the agar substrate to create a sprayed layer film of graphene 204 on agar 202. On each of the 40 passes, the preheated substrate was sprayed with graphene ink while the nozzle of the spray gun kept moving from one end to the other end and the process continued until the whole surface was covered. The resulting ultrathin coated agar substrate was named $AG_{40}$. The total thickness of layered graphene coating was found to be about 4 μm (each single pass corresponded to about 100 nm), see FIG. 2, element 204.

Ultrathin Coating of NC on Graphene Coated Agar ($AG_{40}NC_{80}$)

For the purpose of making an ultrathin tribolayer, nanocellulose (NC) dispersions with the desired concentration were sprayed onto graphene coated agar substrate without any surface treatment, see FIG. 2. The spraying process was followed as discussed above. The process of spraying was repeated for eighty (80) passes and a layered NC film ($NC_{80}$) was prepared with the thickness corresponding to ~ 5-6 μm (each pass is equivalent to 63-75 nm), see FIG. 2, element 206. The resulting agar substrate (200) was measured to have about 10 μm of multilayered triboelectric component with 40 layers of graphene electrode and 80 layers of NC tribolayer. The resulting agar substrate was named $AG_{40}NC_{80}$. The multilayer coatings were strongly adhered to the agar substrate due to hygroscopic nature of agar.

Figure 3A:
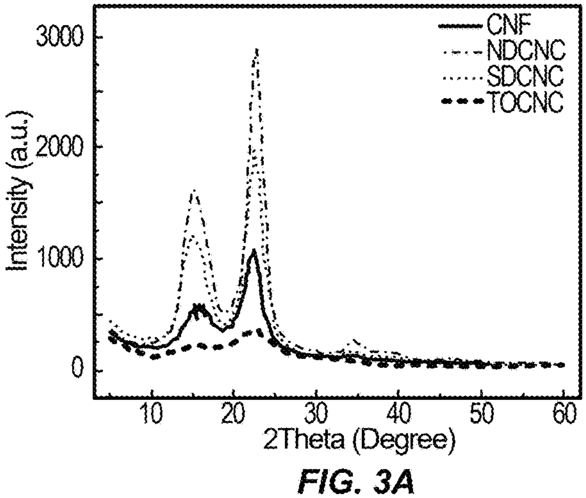
FIG. 3A: Shows a thin film X-Ray Powder Diffraction (XRD) plot for layer by layer sprayed film of $NC_{80}$ depicting cellulose nanofiber (CNF), never-dried cellulose nanocrystal (NDCNC), spray-dried cellulose nanocrystal (SDCNC), and TEMPO-oxidized cellulose nanofiber (TOCNF) on glass substrate, in accordance with embodiments of the disclosure.

Example 5. Molecular and Surface Analysis of Nanocellulose ($NC_{80}$) Layer-by-Layer Sprayed Films Thin film X-Ray Diffraction (XRD) was collected for the $NC_{80}$ layer-by-layer sprayed films using cellulose nanofiber (CNF), never-dried cellulose nanocrystal (NDCNC), spray-dried cellulose nanocrystal (SDCNC), and TEMPO-oxidized cellulose nanofiber (TOCNF). Not intending to be bound by theory, the high intensity bands at about 15 and 23 2θ (Degree) suggest morphological consistencies between the different NCs. For XRD pattern of all NC films, the diffraction peaks at 2θ equals to 15.1°, 15.7° and 22.5° corresponds to (110), (110) and (200) planes, respectively, in agreement with the characteristic peaks of cellulose 1. However, the peak at 2θ equal to 34.5° corresponding to (004) plane is only visible in NDCNC and SDCNC films. Moreover, these films have semi-crystalline nature with high crystallinity. See FIG. 3A.

Figure 3B:
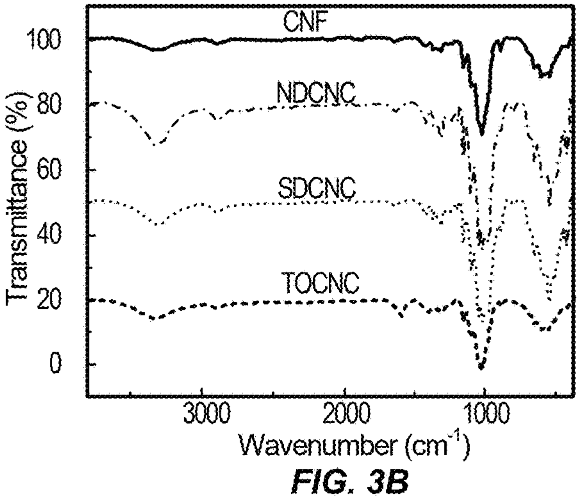
FIG. 3B: Shows an Infrared (IR) spectroscopy plot for free-standing layer by layer sprayed film of $NC_{80}$ depicting cellulose nanofiber (CNF), never-dried cellulose nanocrystal (NDCNC), spray-dried cellulose nanocrystal (SDCNC), and TEMPO-oxidized cellulose nanofiber (TOCNF), in accordance with embodiments of the disclosure.

Fourier-Transform Infrared Spectroscopy (FTIR) data was collected for $NC_{80}$ layer-by-layer sprayed films using cellulose nanofiber (CNF), never-dried cellulose nanocrystal (NDCNC), spray-dried cellulose nanocrystal (SDCNC), and TEMPO-oxidized cellulose nanofiber (TOCNF). The FTIR spectra of all NC films was used to confirm its chemical composition. Not intending to be bound by theory, data suggests molecular arrangement similarities between the different NCs based on the stretching mode of bonds in the fingerprint region of the IR spectra and the 2800-3500 wavenumber ($cm^{-1}$) region of the spectra. This confirms the functional group similarities between all NC films such as C—O (1050 $cm^{-1}$), C—H (2900 $cm^{-1}$), —$CH_2$, (1426 $cm^{-1}$) and —OH (3340 cm-1, and 1640 $cm^{-1}$). The chemical structure of CNF is the same as native cellulose whereas the peak at 1604 $cm^{-1}$ in TOCNF indicates the presence of carboxylate and the peak at 1205 $cm^{-1}$ in NDCNC and SDCNC is related to the S═O vibration, corresponding the esterification. See FIG. 3B.

Figure 3C:
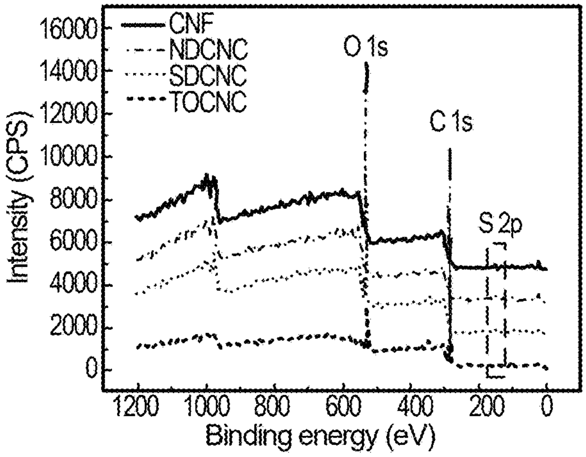
FIG. 3C: Shows an X-Ray photoelectron spectroscopy (XPS) plot for free-standing layer by layer sprayed film of $NC_{80}$ depicting cellulose nanofiber (CNF), never-dried cellulose nanocrystal (NDCNC), spray-dried cellulose nanocrystal (SDCNC), and TEMPO-oxidized cellulose nanofiber (TOCNF), in accordance with embodiments of the disclosure.
Figure 3D:
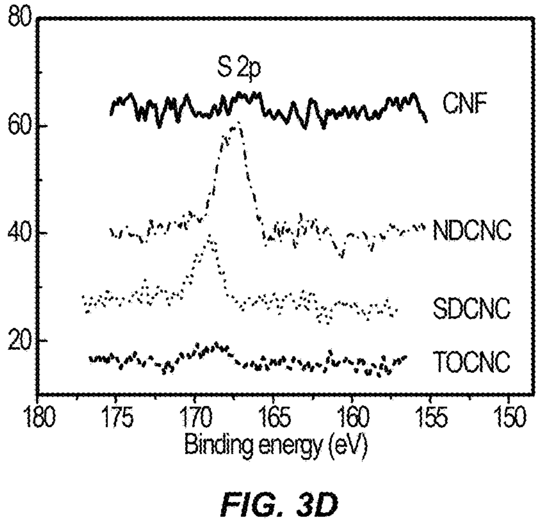
FIG. 3D: Shows a X-Ray photoelectron spectroscopy (XPS) plot for cellulose nanofiber (CNF), never-dried cellulose nanocrystal (NDCNC), spray-dried cellulose nanocrystal (SDCNC), and TEMPO-oxidized cellulose nanofiber (TOCNF), in accordance with embodiments of the disclosure.

X-ray photoelectron spectroscopy (XPS) data was collected for $NC_{80}$ layer-by-layer sprayed films using cellulose nanofiber (CNF), never-dried cellulose nanocrystal (NDCNC), spray-dried cellulose nanocrystal (SDCNC), and TEMPO-oxidized cellulose nanofiber (TOCNF). Not intending to be bound by theory, data suggests molecular arrangement similarities between the different NCs based on the binding energy (eV) output. See FIG. 3C. As can be seen in FIG. 3D, all NC films displayed characteristic peaks of cellulose at 530 eV and 283 eV which correspond to $O_{1s}$ and $C_{1s}$, respectively. Only NDCNC and SDCNC displayed the existence of another element at 167 eV and 169 eV, respectively, which corresponds to $S_{2p}$ which is high-resolution XPS spectrum corresponding to $S_{2p}$. Not intending to be bound by theory, the XPS results align with the fact that the surface of NDCNC and SDCNC has charged sulfate ester group (—$OSO^{3-}$—) introduced by the reaction between $H_2SO_4$ and the hydroxyl group on cellulose during hydrolysis.

Figure 3E:
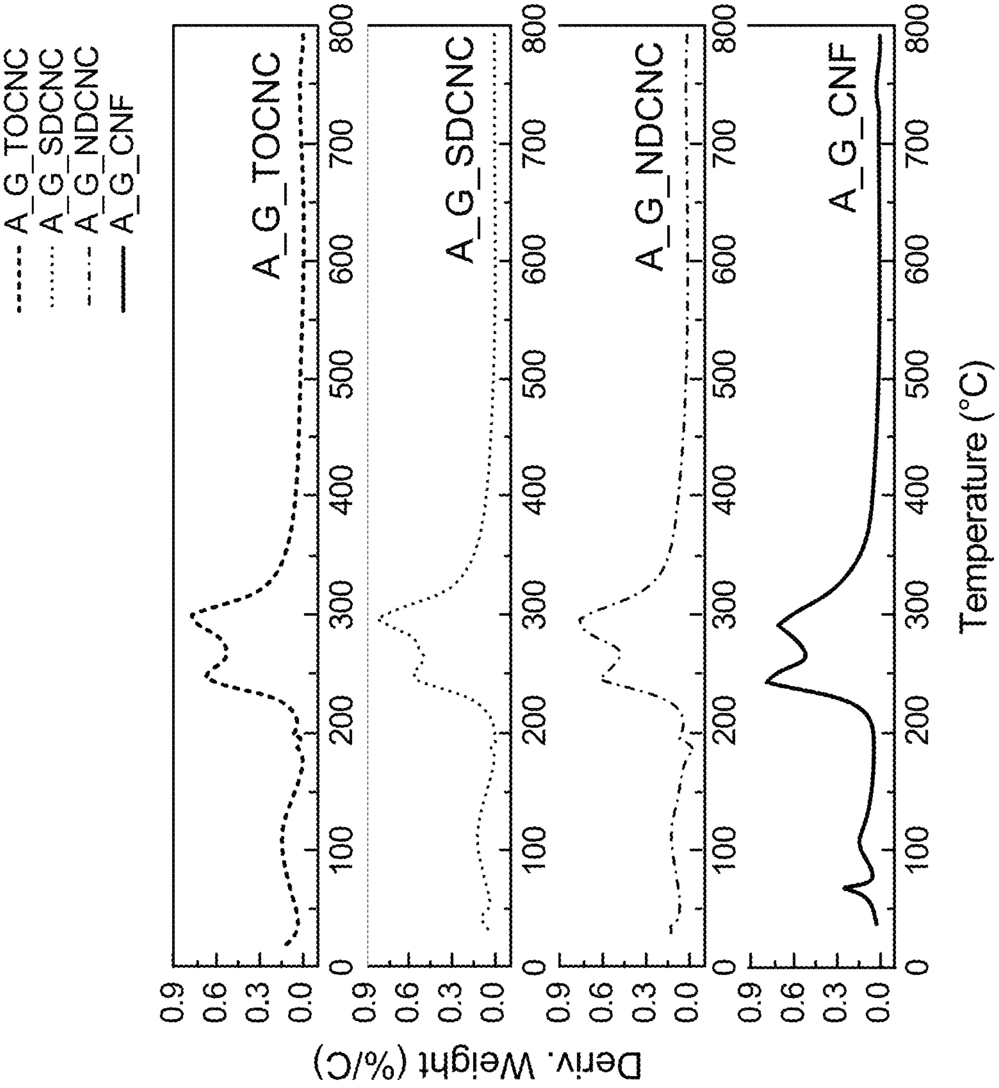
FIG. 3E: Shows a Fourier Transform Infrared Spectroscopy (FTIR) spectroscopy plot for spray coating of layered NC ($NC_{80}$) on graphene coated agar ($AG_{40}$) depicting cellulose nanofiber (CNF), never-dried cellulose nanocrystal (NDCNC), spray-dried cellulose nanocrystal (SDCNC), and TEMPO-oxidized cellulose nanofiber (TOCNF), in accordance with embodiments of the disclosure.
Figure 3F:
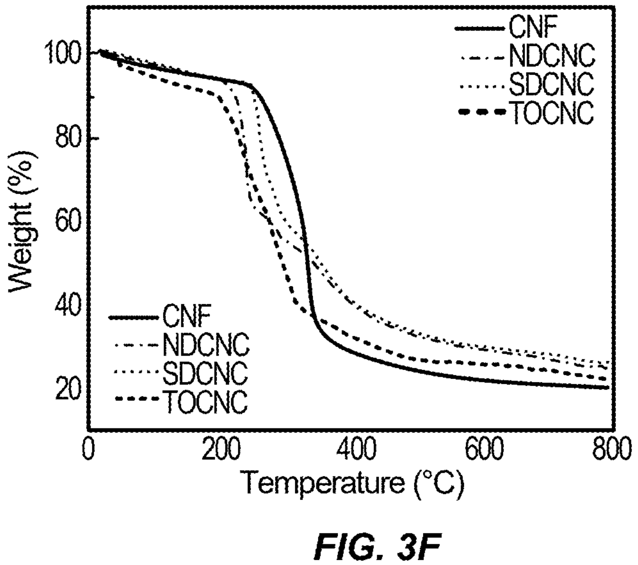
FIG. 3F: Shows a thermogravimetric analysis (TGA) plot for free-standing layer by layer sprayed film of $NC_{80}$ depicting cellulose nanofiber (CNF), never-dried cellulose nanocrystal (NDCNC), spray-dried cellulose nanocrystal (SDCNC), and TEMPO-oxidized cellulose nanofiber (TOCNF), in accordance with embodiments of the disclosure.
Figure 3G:
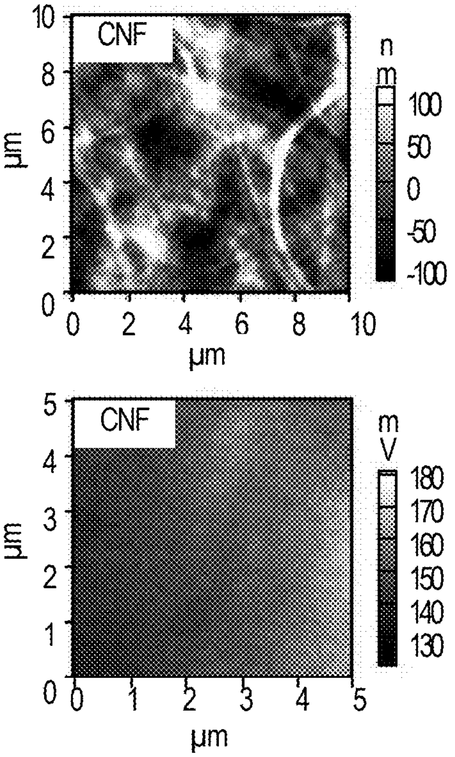
FIG. 3G: Shows an atomic force microscopy (AFM) image (up) and Kelvin probe force microscopy (KPFM) image (down) of cellulose nanofiber (CNF) free-standing layer by layer sprayed film of $NC_{80}$, in accordance with embodiments of the disclosure.
Figure 3H:
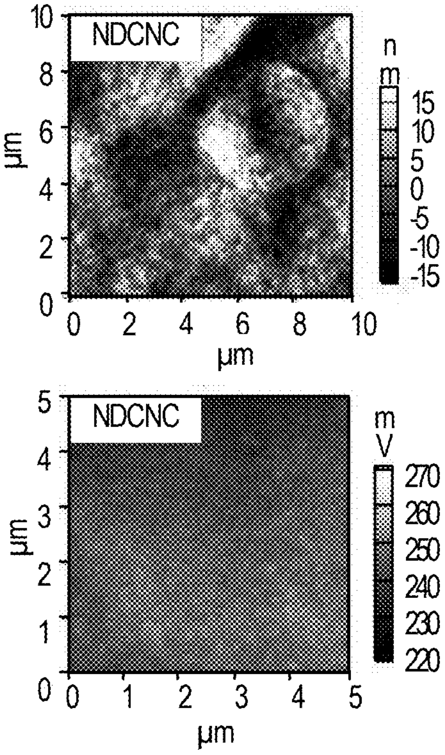
FIG. 3H: Shows an atomic force microscopy (AFM) image (up) and Kelvin probe force microscopy (KPFM) image (down) of never-dried cellulose nanocrystal (NDCNC) free-standing layer by layer sprayed film of $NC_{80}$, in accordance with embodiments of the disclosure.
Figure 3I:
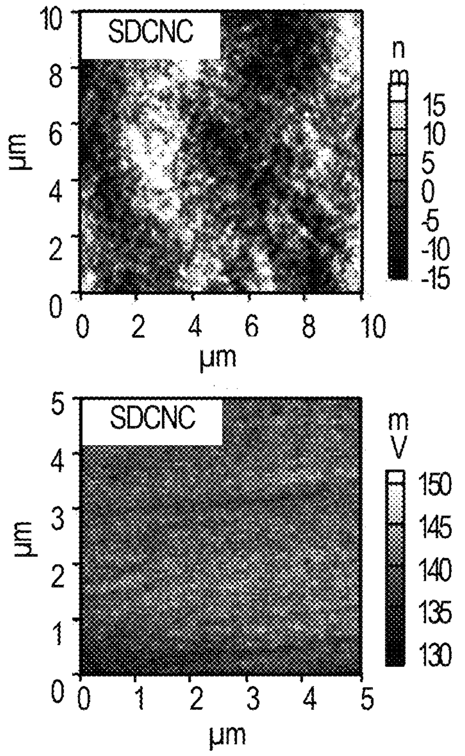
FIG. 3I: Shows an atomic force microscopy (AFM) image (up) and Kelvin probe force microscopy (KPFM) image (down) of spray-dried cellulose nanocrystal (SDCNC) free-standing layer by layer sprayed film of $NC_8$, in accordance with embodiments of the disclosure.
Figure 3J:
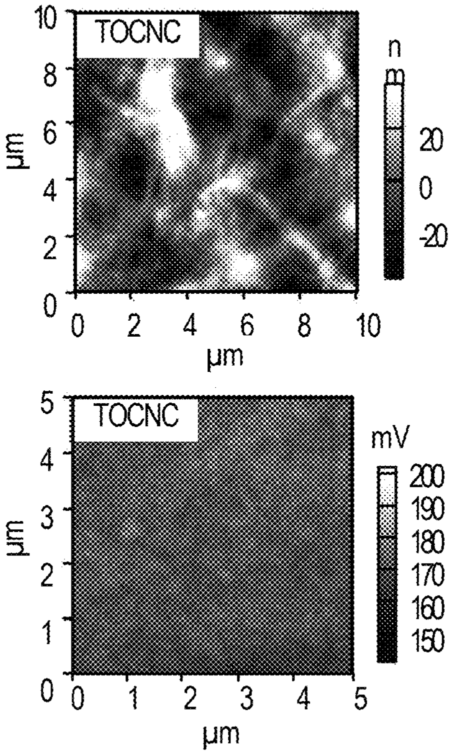
FIG. 3J: Shows an atomic force microscopy (AFM) image (up) and Kelvin probe force microscopy (KPFM) image (down) of TEMPO-oxidized cellulose nanofiber (TOCNF) free-standing layer by layer sprayed film of $NC_{80}$, in accordance with embodiments of the disclosure.

Thermogravimetric analysis (TG) data and differential thermogravimetric analysis (DTG) which is derivative of TG was collected for $NC_{80}$ layer-by-layer sprayed films made of cellulose nanofiber (CNF), never-dried cellulose nanocrystal (NDCNC), spray-dried cellulose nanocrystal (SDCNC), and TEMPO-oxidized cellulose nanofiber (TOCNF). See FIGS. 3D and 3E. Not intending to be bound by theory, data suggests similar decomposition points for the different NCs. The initial small weight loss was observed for all the NC films except for CNF. This initial weight loss at low range temperature (20-50 °C) may correspond to the absorbed water evaporation. This initial weight loss range appears to be limited to 20-30 °C for NDCNC and SDCNC and was not clearly seen for CNF. Not intending to be bound by theory, data suggests the relative hydrophobic nature of the CNF film as compared to TOCNF. Degradation of all the samples started at temperatures >200 °C. Degradation of NDCNC and TOCNF started early, at 200 °C, as compared to SDCNC and CNF film, for which the degradation started at 230 °C and 240 °C, respectively. CNF experienced significant weight loss in the range of 240-370 °C having slow weight reduction in the beginning followed by instant weight reduction. Moreover, DTG curve of CNF showed that the thermal decomposition peak of maximum weight loss appeared at 334 °C. In contrast, NDCNC and SDCNC experienced a small degradation range of 230-310 °C and 200-300 °C, respectively, with instant drastic weight loss in the beginning, followed by slow weight loss. The DTG curves of NDCNC and SDCNC showed a rapid thermal degradation peak for maximum weight loss at 238 °C and 260 °C, respectively whereas the degradation peak for small weight loss appeared at 292 °C and 287 °C, respectively. In contrast, TOCNF experienced weight loss between 200-330 °C with two major weight loss behavior having thermal decomposition peaks at 233 °C and 300 °C. Not intending to be bound by theory, CNF ultrathin films appeared to be the thermally most stable among all. See FIG. 3F.

The morphological study of all the NC ultrathin films that are spray coated onto glass substrate are shown in AFM images, see top images of FIG. 3G-3J. NDCNC and SDCNC are rod-shaped, high-aspect ratio crystals and are visible whereas CNF and TOCNF appear to have a fibrous nature with very high aspect ratio fibers. As previously reported, the dimensions of NDCNC range from 5 nm to 20 nm in width and 150 nm to 200 nm in length. NDCNC has a narrow size distribution. On the other hand, SDCNC has a wide size distribution with particles that range from 60 nm to 500 nm in length (183±88 nm) and width of 6±2 nm yielding an aspect ratio of 31. Even though the AFM images of NDCNC and SDCNC do not tell the exact dimension of the individual fiber because the boundaries are not visible due to piling up, the crystal size and aspect ratio of SDCNC is higher than NDCNC. CNF has been reported to have a length of 1.46±0.8 μm and a diameter of 35±12 nm for 6 fluidizer passes. Similarly, the TOCNF has been reported to have a length of a few microns which is the same as CNF but with a diameter that is equivalent to the dimension of elementary wood fibril which is ~4 nm. Not intending to be bound by theory, therefore, the surface roughness of the film prepared using CNF is very high and the surface roughness of other NC films is comparable.

In order to measure the surface potential of the different NC films made of CNF, NDCNC, SDCNC and TOCNF, KPFM was carried out for the same, see bottom images of FIG. 3G-3J. It is evident from the KPFM image that the surface potential of all the NC films is positive in nature. From FIG. 3G-3J it can be seen that the highest surface potential is obtained for NDCNC with approximately 100 mV positive as compared to CNF or SDCNC. Moreover, TOCNF prepared using TEMPO oxidation method also showed slight increase in the surface potential with respect to CNF and SDCNC. Obtaining a surface potential of the triboelectric layer is crucial when designing a high performing TENG. Not intending to be bound by theory, data suggests that all NC films can be used as a positive triboelectric layer. The preparation conditions can alter the functional groups present on the surface of cellulose and therefore can tune the surface potential of the triboelectric layer.

Figure 4A:
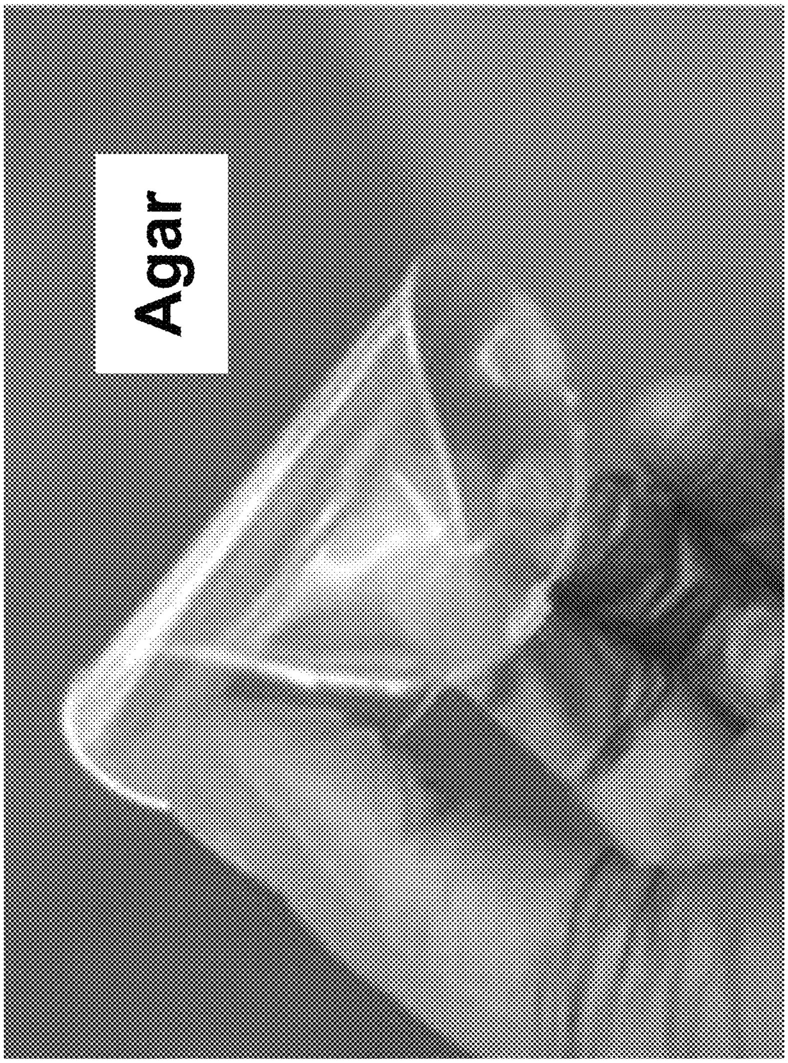
FIG. 4A: Shows a photograph of agar substrate featuring the substrate's flexibility, in accordance with embodiments of the disclosure.
Figure 4B:
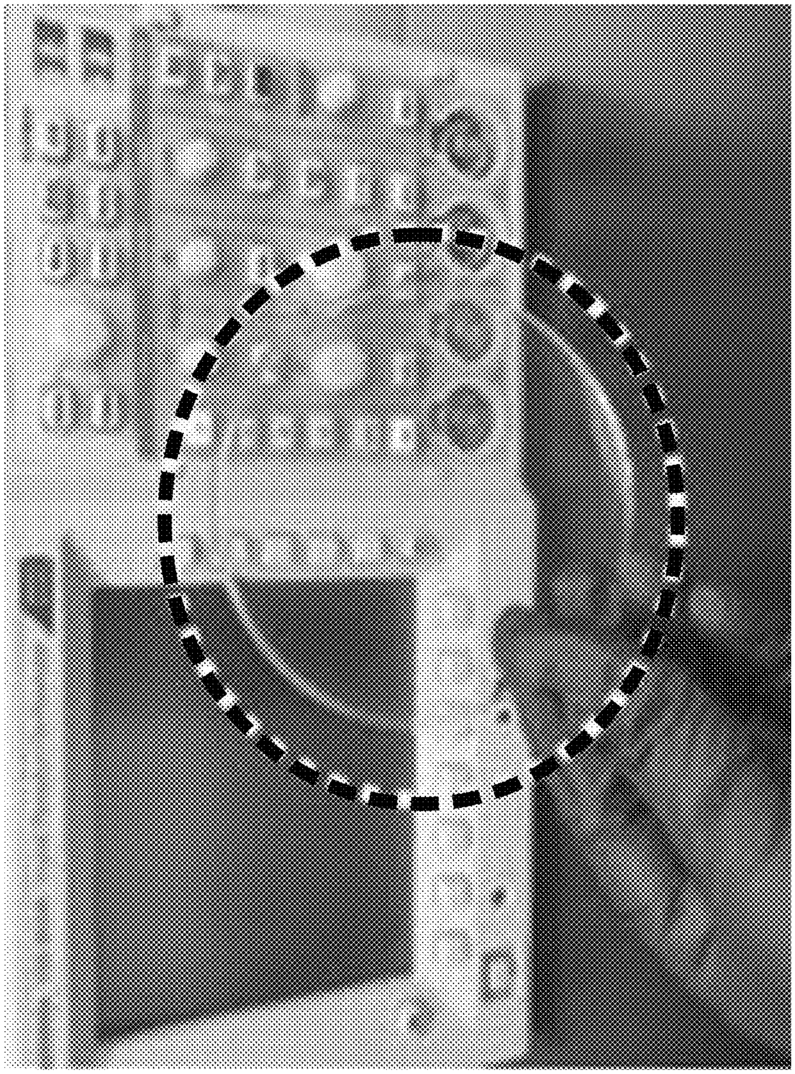
FIG. 4B: Shows a photograph of agar substrate featuring the substrate's transparency, in accordance with embodiments of the disclosure.
Figure 5:
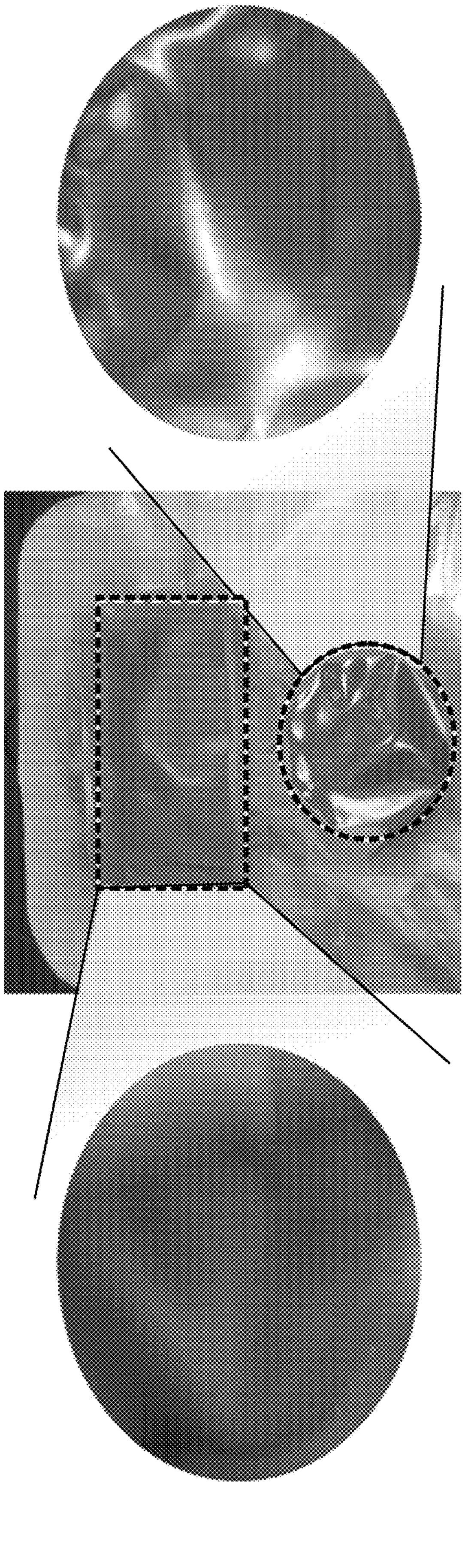
FIG. 5: Shows a photograph of a spray-coated graphene film ($G_{40}$) on PET (left) and agar (right) substrates, in accordance with embodiments of the disclosure.

Example 6. Physical Properties of Spray-Coated Layered Graphene ($G_{40}$) on Agar and PET Substrate As shown in FIGS. 4A-B, the agar substrate showed significantly flexible and transparent properties. Once the agar substrate was spray-coated with layered graphene ($G_{40}$) it displayed a reflective surface. See FIG. 5, right. When the graphene was on PET ($PG_{40}$) the reflective surface was opaque. See FIG. 5, left.

Figure 6:
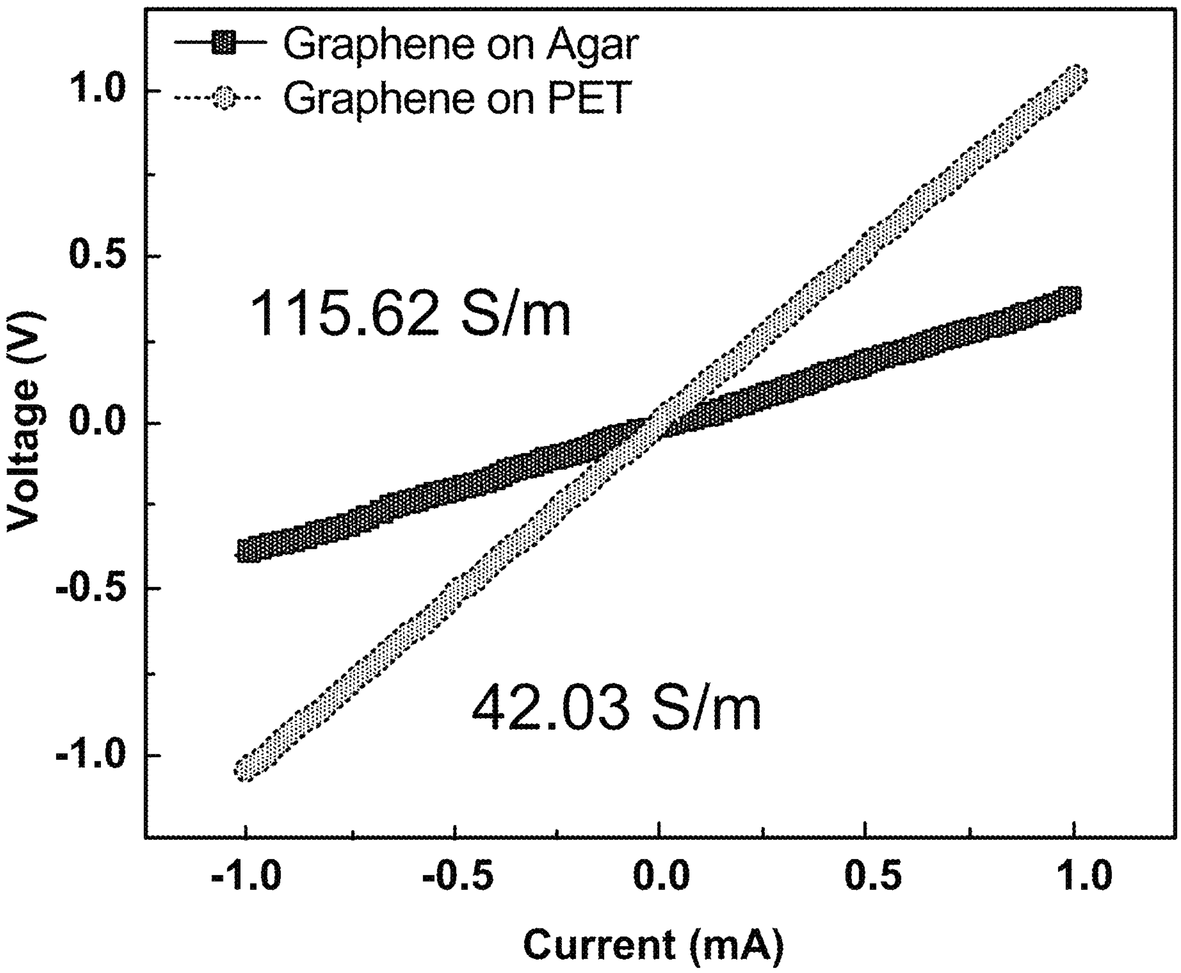
FIG. 6: Shows a voltage v. current plot of the conductivity of graphene on agar and graphene on PET, in accordance with embodiments of the disclosure.

Current-voltage measurements using a four-probe setup were conducted to estimate the conductivity of graphene on agar and PET substrates. The conductivity of graphene on agar (115.62 S/m) was better than the conductivity of graphene on PET (42.03 S/m), measured using four probes. See FIG. 6. Not intending to be bound by theory, the higher conductivity of graphene in case of agar substrate may be related to the uniform distribution of graphene owing to hydrophilic/hygroscopic nature of agar. Not intending to be bound by theory, this may reduce the likelihood of defects such as pinholes, cracks, or uneven thickness. Consequently, the improved integration of the film material with the substrate enhances the interconnectivity between graphene nanosheets, resulting in more efficient charge conducting pathways. For example, instant spreading and absorption may lead to proper stacking of graphene nanosheets. However, in the case of PET, the droplet with suspended graphene may experience a coffee-ring effect, leading to non-uniform distribution of graphene throughout the substrate with lower conductivity. Due to the coffee-ring effect the suspended graphene may be deposited in a ring-like pattern along the edge of the droplet. During drying, the drop edges may pin to the substrate and therefore, in order to compensate the large evaporation loss of the liquid at the edge, the liquid in the droplet may move towards the edge along with the suspended graphene. Thus, and while not intending to be bound by theory, the coffee-ring effect may result in the lower conductivity of graphene on PET.

Figure 7A:
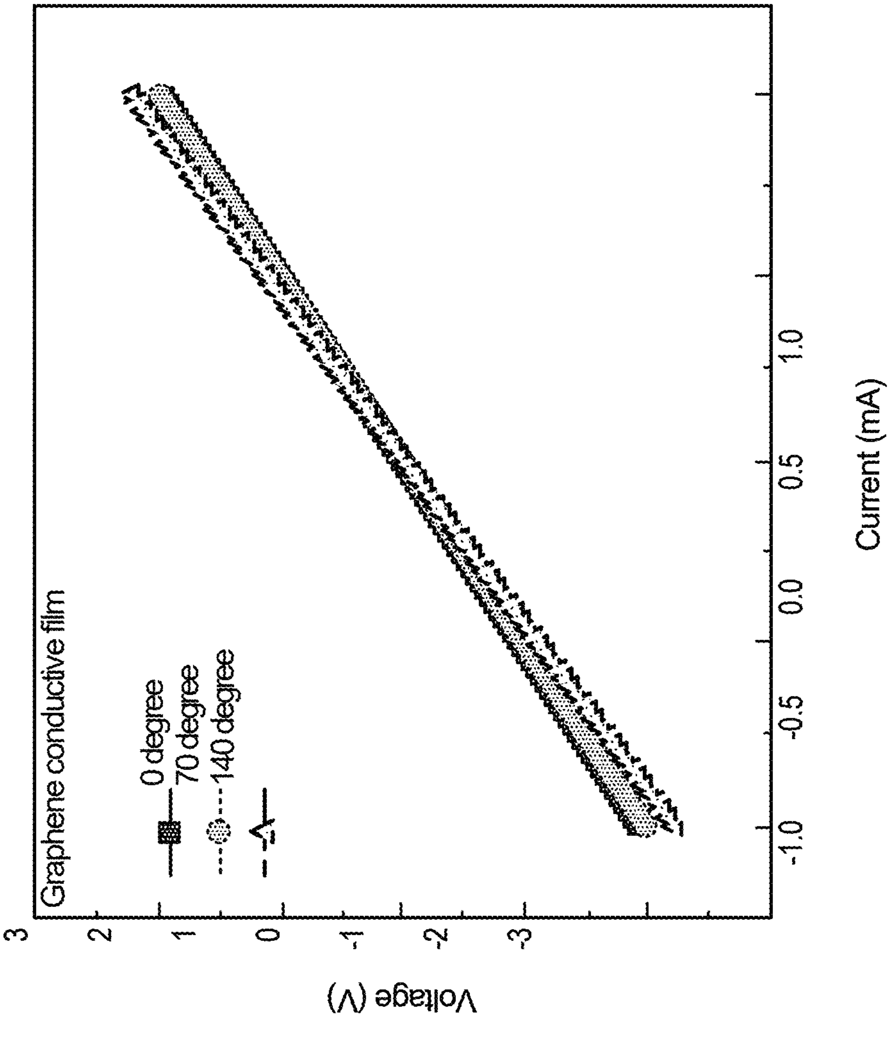
FIG. 7A: Shows a plot of voltage v. current of the ultrathin layered graphene sprayed on agar substrate, in accordance with embodiments of the disclosure.
Figure 7B:
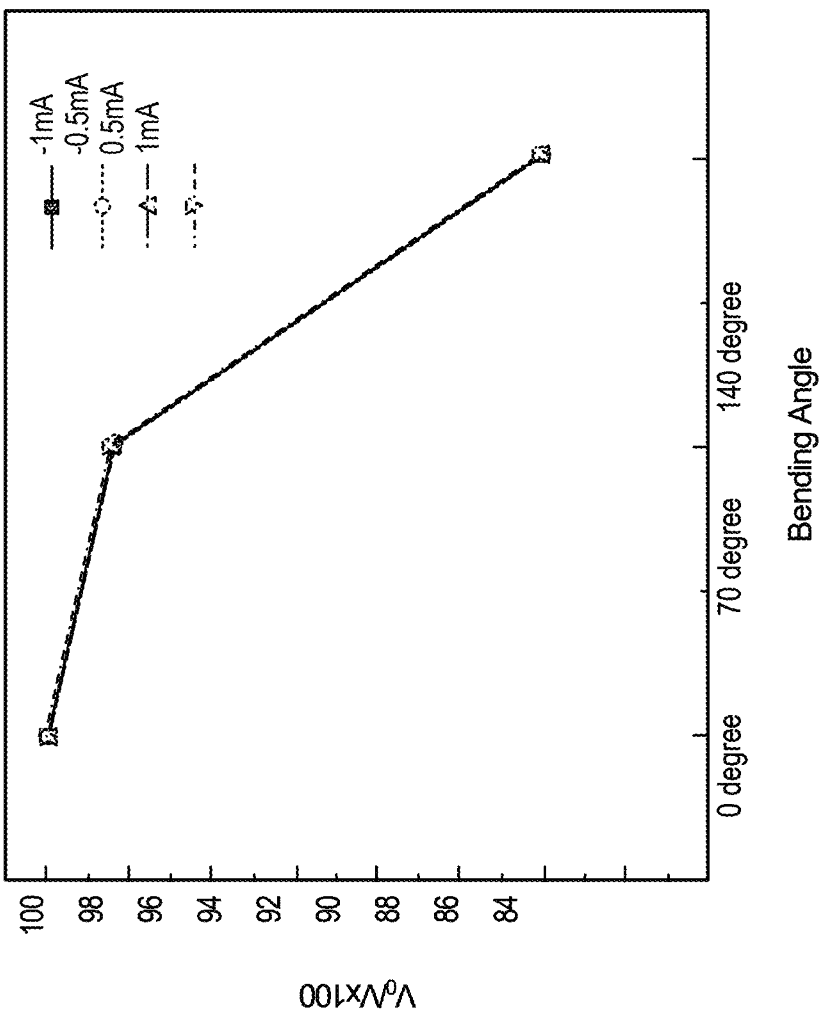
FIG. 7B: Shows a plot of voltage variation at different bending angles of the ultrathin layered graphene sprayed on agar substrate, in accordance with embodiments of the disclosure.

The effect of different bending angles on the IV curve of ultrathin layered graphene sprayed onto agar substrate are summarized in FIGS. 7A-B. Not intending to be bound by theory, data suggests that the conductivity of graphene remains consistently maintained at different bending angles of 0, 70, and 140 degrees as all the curves overlap with each other having the same slope. As used herein, "bending angle" is the angle between the tangents drawn onto the surface of the substrate. Moreover, the voltage variation ($V_0/V \times 100$) is almost negligible at different bending angles. Here, $V_0$ is voltage for zero bending angle. Not intending to be bound by theory, the small variation in case of 140 degree bending angle is likely due to probe contact rather than to a change in film properties.

Example 7. NC Sprayed on Graphene Coated PET and Graphene Coated Agar

Figure 8A:
FIG. 8A: Shows a picture of a spray coating of layered NC on graphene coated PET ($PG_{40}$) labelled as $PG_{40}NC_{70}$, in accordance with embodiments of the disclosure.
Figure 8B:
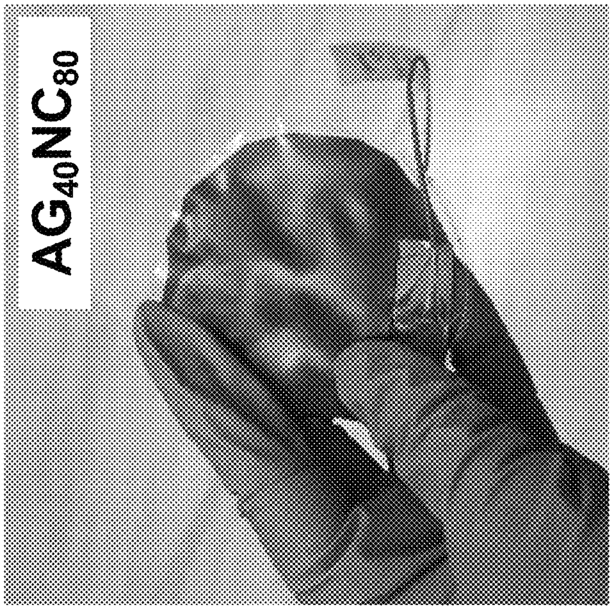
FIG. 8B: Shows a picture of a spray coating of layered NC on graphene coated agar ($AG_{40}$) labelled as $AG_{40}NC_{80}$, in accordance with embodiments of the disclosure.
Figure 8C:
FIG. 8C: Shows a picture of a spray coating of layered NC on graphene coated agar ($AG_{40}$) labelled as $AG_{40}NC_{80}$, in accordance with embodiments of the disclosure.

FIGS. 8A-C show images of the spray coating of layered NC ($NC_{80}$) on graphene-coated PET ($PG_{40}$), labeled as $PG_{40}NC_{70}$, and graphene-coated agar ($AG_{40}$), labeled as $AG_{40}NC_{80}$. NC sprayed on PET substrate is found to delaminate after 70 passes, due to internal strain during the drying process. In contrast, NC sprayed on graphene coated agar does not delaminate at 70 passes and can instead be layered to 80 passes. Being hydrophilic/hygroscopic as compared to PET, agar can expand and swell during spraying and heating, respectively. Therefore, agar can accommodate and tolerate the internal strain of NCs while drying, reducing the chances of crack and delamination.

Example 8: Preparation of Graphene/Nanocellulose Based Ultrathin Triboelectric Component on Hydrophobic PET Substrate ($PG_{40}NC_{70}$)

Similar to the agar substrate, an ultrathin triboelectric component (electrode and tribolayer) was spray coated onto a hydrophobic non-degradable PET substrate.

Ultrathin Coating of Graphene on PET ($PG_{40}$)

Prior to deposition, PET substrate was cleaned with isopropyl alcohol and DI water. With continuous thermal treatment at 60 °C, 40 layers of graphene were deposited onto PET to make an ultrathin electrode.

Ultrathin Coating of NC on Graphene Coated PET ($PG_{40}NC_{70}$)

Similar to agar, for the fabrication of a dielectric layer onto layered graphene-coated PET substrate, 70 layers of NCs were deposited. Thus, the PET substrate has multilayer triboelectric component with 40 layers of graphene electrode and 70 layers of NC tribolayer. The dielectric layer onto layered graphene-coated PET was named $AG_{40}NC_{70}$. The limit was set at 70 passes because the spray coated layers began to delaminate due to internal strain during drying.

Example 9. Preparation of Castor Oil (CO) Based Film

Here, the silane-based modification on castor oil was performed by synthesizing hybrids such as castor oil-amine-TMSPM and castor oil-amine-TMSPM-VTES. Here, TMSPM is 3-(trimethoxysilyl) propyl methacrylate and VTES is vinyltriethoxysilane. For the preparation of castor oil-amine-TMSPM hybrid, castor oil and para-aminobenzoic acid was made to react at 100 °C for 8 h in the presence of p-toluenesulfonic acid as a catalyst. Later, TMSPM and boron trifluoride etherate were added to the above mixture and the reaction was maintained at 50 °C for 24 h. Further, preparation of castor oil-amine-TMSPM-VTES was done by adding desired concentration of VTES at 50 °C and the reaction was continued for 2 h. UV cured films were formed by mixing these hybrids with photo-initiator and cross linker followed by casting onto a glass slide using doctor blade technique.

Example 10. Preparation of a Triboelectric Nanogenerator (TENG)

Figure 9A:
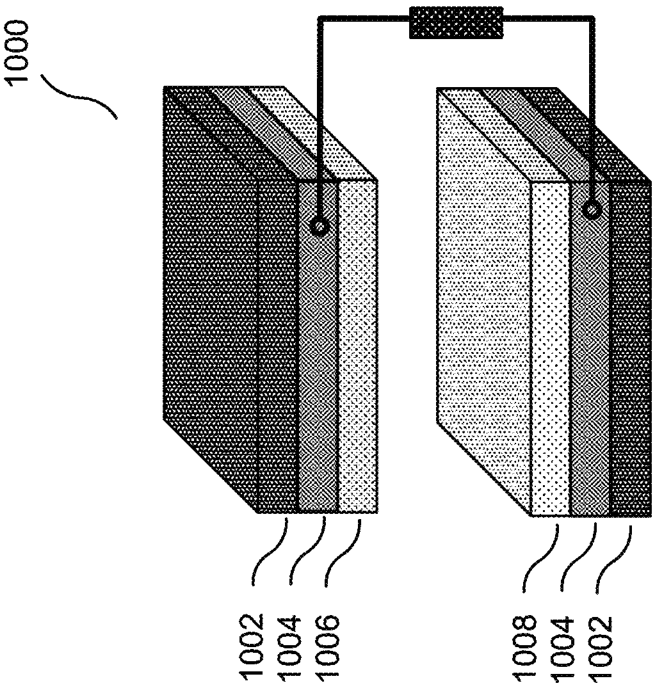
FIG. 9A: Shows a cartoon of a PET/Cu/$NC_{80}$-PI/Cu/PET dual-electrode TENG, in accordance with embodiments of the disclosure.
Figure 9B:
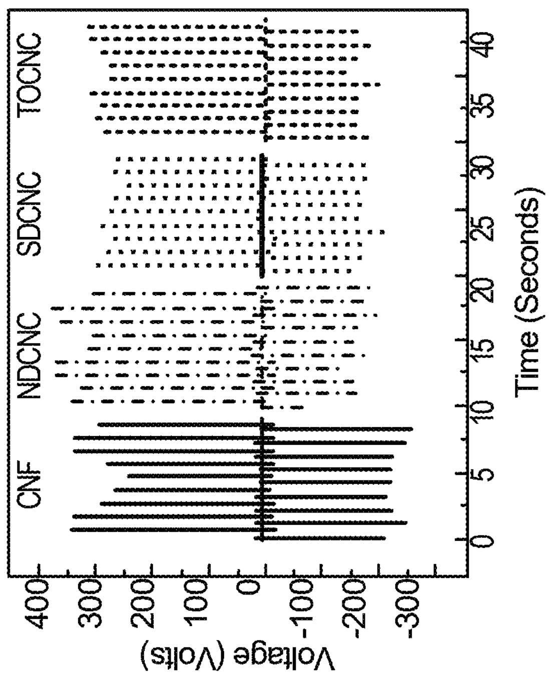
FIG. 9B: Shows a plot of the output represented in a voltage v. time graph for cellulose nanofiber (CNF), never-dried cellulose nanocrystal (NDCNC), spray-dried cellulose nanocrystal (SDCNC), and TEMPO-oxidized cellulose nanofiber (TOCNF) for a PET/Cu/$NC_{80}$-PI/Cu/PET dual-electrode TENG, in accordance with embodiments of the disclosure.
Figure 10A:
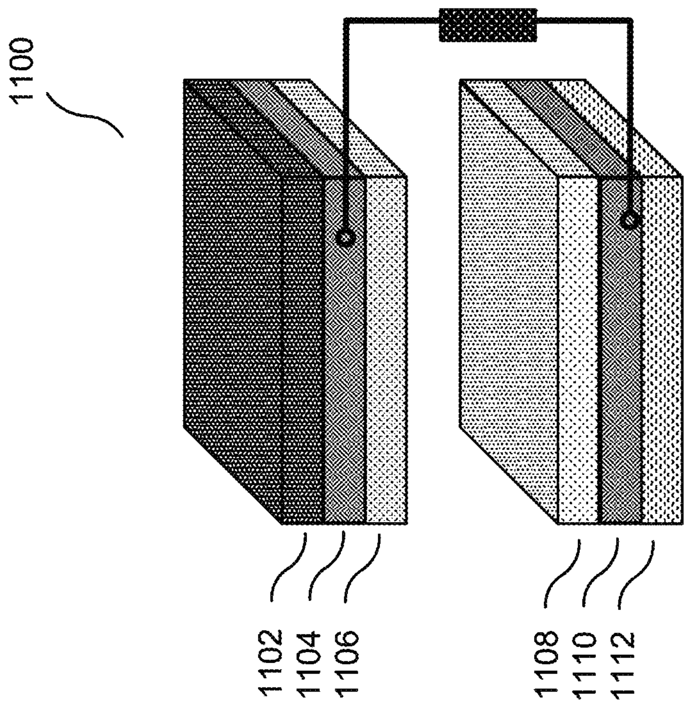
FIG. 10A: Shows a cartoon of a A/$G_{40}$/$NC_{80}$-PI/Cu/PET dual-electrode TENG, in accordance with embodiments of the disclosure.
Figure 10B:
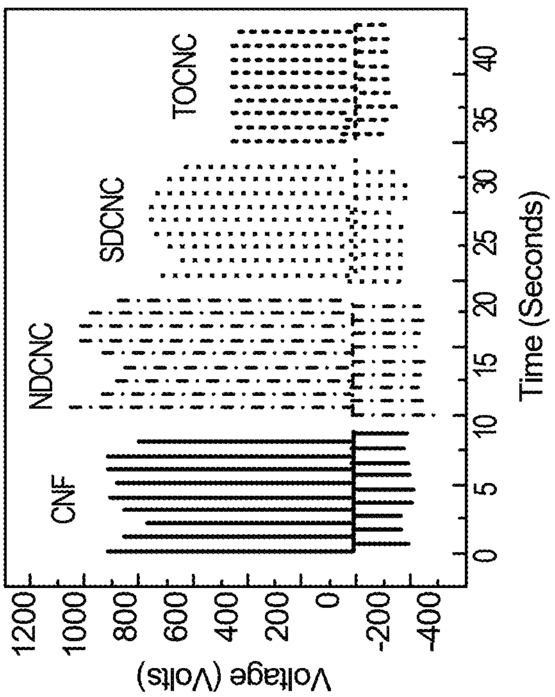
FIG. 10B: Shows a plot of the output represented in a voltage v. time graph for cellulose nanofiber (CNF), never-dried cellulose nanocrystal (NDCNC), spray-dried cellulose nanocrystal (SDCNC), and TEMPO-oxidized cellulose nanofiber (TOCNF) for a A/$G_{40}$/$NC_{80}$-PI/Cu/PET dual-electrode TENG, in accordance with embodiments of the disclosure.
Figure 11A:
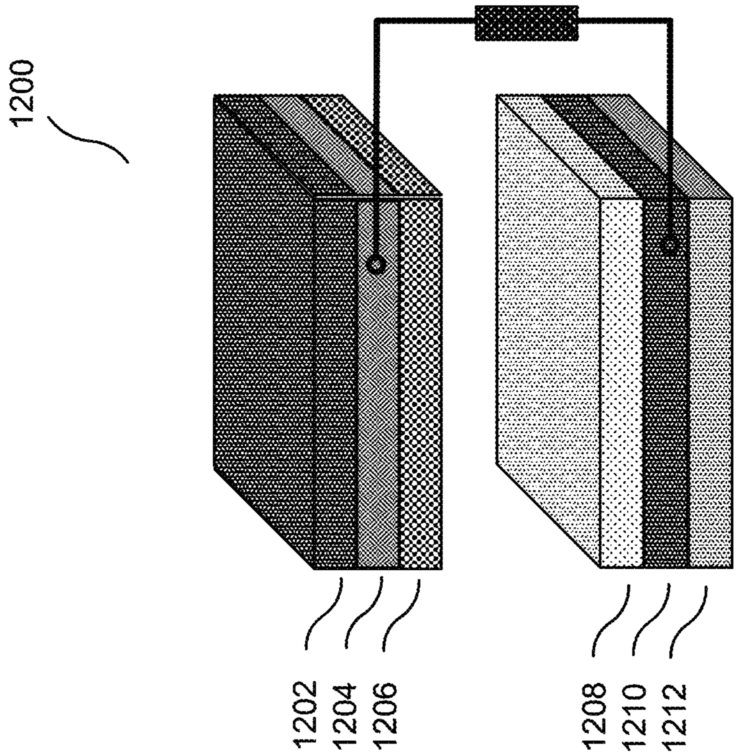
FIG. 11A: Shows a cartoon of a A/$G_{40}$/$NC_{80}$-CO/Cu/PET dual electrode TENG, in accordance with embodiments of the disclosure.
Figure 11B:
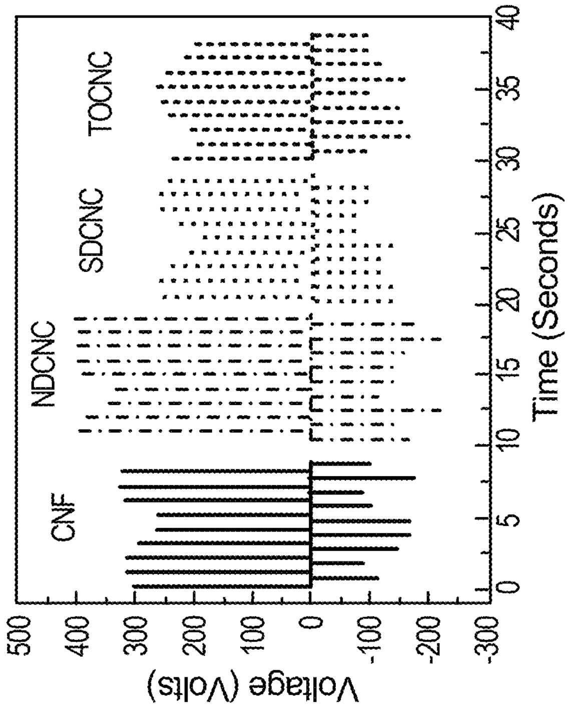
FIG. 11B: Shows a plot of the output represented in a voltage v. time graph for cellulose nanofiber (CNF), never-dried cellulose nanocrystal (NDCNC), spray-dried cellulose nanocrystal (SDCNC), and TEMPO-oxidized cellulose nanofiber (TOCNF) for a A/$G_{40}$/$NC_{80}$-CO/Cu/PET dual electrode TENG, in accordance with embodiments of the disclosure.

Triboelectric nanogenerators (TENGs) of ultrathin layered NC films ($NC_{80}$) of different origin and different processing methodology (different surface functional groups) were prepared using different types of electrodes (ultrathin layered graphene and commercial Cu tape) and substrates (hygroscopic agar and hydrophobic PET), FIGS. 9-11. Further, an all-polysaccharide based single electrode TENG named $AG_{40}/NC_{80}$ was made. See FIG. 12A. Later, the use of $AG_{40}NC_{80}$-based single electrode TENG as ultrathin biocompatible and conformable electronic skin (e-skin) for material identification was explored using different materials. See FIGS. 11B-12L.

PET/Cu/$NC_{80}$-PI/Cu/PET TENG: Operated in Dual Electrode Contact Separation Mode TENG with an active area of 3×3 $cm^2$ was made by attaching free standing ultrathin NC based films (NDCNC, SDCNC, CNF and TOCNF) to the adhesive side of Cu tape 1004 and later, PET film-based substrate 1002 was attached to the Cu tape using thin double-sided tape (PET/Cu/$NC_{80}$). See FIGS. 9A-B. Other device components were prepared by adding commercial PI 1006 to the adhesive side of the Cu tape while using PET 1002 as substrate (PI/Cu/PET). In this example, NC films 1008 and PI films 1006 were used as positive and negative tribolayers. Moreover, all the devices were operated in contact-separation mode, where the contact and separation of the tribolayers were done using an automated setup. The corresponding TENG (PET/Cu/$NC_{80}$-PI/Cu/PET) output is represented in a voltage vs. time graph for various NC materials: cellulose nanofiber (CNF), never-dried cellulose nanocrystal (NDCNC), spray-dried cellulose nanocrystal (SDCNC), and TEMPO-oxidized cellulose nanofiber (TOCNF).

$AG_{40}NC_{80}$-PI/Cu/PET TENG: Operated in Dual Electrode Contact Separation Mode For the preparation of this ultrathin component based TENG, the commercial electrode (copper tape—1104) and substrate (PET—1102) were replaced with ultrathin graphene 1110 and agar 1112, respectively. See FIGS. 10A-B. One component of TENG was made of agar 1112, graphene 1110, and NCs 1108 ($A/G_{40}/NC_{80}$) as the substrate, electrode, and triboelectric layer, respectively, with NC 1108 being at the top facing the other tribolayer. The other component of the device was made of PI 1106, Cu 1104 and PET 1102 as the negative tribolayer, electrode and substrate, respectively. The corresponding TENG ($A/G_{40}/NC_{80}$-PI/Cu/PET) output is represented in a voltage vs. time graph for various NC materials: cellulose nanofiber (CNF), never-dried cellulose nanocrystal (NDCNC), spray-dried cellulose nanocrystal (SDCNC), and TEMPO-oxidized cellulose nanofiber (TOCNF).

$AG_{40}NC_{80}$-CO/Cu/PET all-Biopolymer Based TENG: Operated in Dual Electrode Contact Separation Mode For the preparation of this all-biopolymer based TENG, agar 1212, graphene 1210, and NC 1208 ($A/G_{40}/NC_{80}$) was used as one triboelectric ultrathin component, whereas the other non-degradable PI was replaced with a biopolymer-based tribe-negative layer made of modified castor oil (CO) 1206. See FIGS. 11A-B. The other component of the device was made of CO 1206, Cu 1204 and PET 1202 as the negative tribolayer, electrode and substrate, respectively. In this TENG, both components of the tribolayer (i.e., nanocellulose and castor oil) are made of biopolymer derived elements. The voltage vs. time plot shows the corresponding TENG output for various NC materials: cellulose nanofiber (CNF), never-dried cellulose nanocrystal (NDCNC), spray-dried cellulose nanocrystal (SDCNC), and TEMPO-oxidized cellulose nanofiber (TOCNF).

$AG_{40}NC_{80}$ Based Single Electrode all-Polysaccharide TENG

Figure 12A:
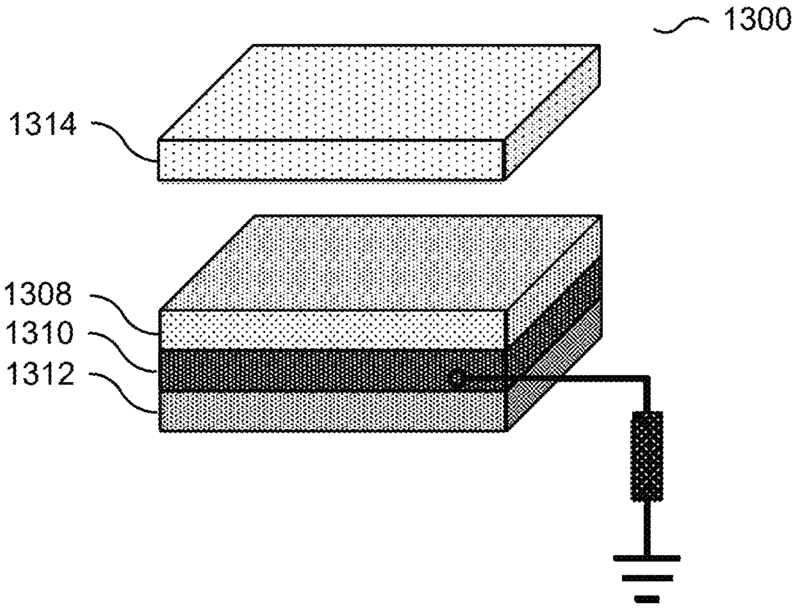
FIG. 12A: Shows a cartoon of electronic skin (e-skin) made of A/$G_{40}$/$NC_{80}$ (all-polysaccharide) based single electrode TENG where there is an electrically contact-free tribolayer, in accordance with embodiments of the disclosure.

All polysaccharide based TENGs were made using agar 1312, graphene 1310, and NC 1308 ($A/G_{40}/NC_{80}$) yielding a layered and ultrathin triboelectric component. See FIG. 12A. FIG. 12A is a schematic illustration showing the device geometry and the measured output voltage of an all-polysaccharide ($AG_{40}NC_{80}$)-based single electrode TENG for electronic skin (e-skin) applications. The ultrathin component was used as an e-skin for different materials 1314 identification owing to its conformable and breathable nature. Here, the other tribolayers 1314 are electrically free of contact. Furthermore, the other frictional layers can be anything and, based on the output performance, they can be used for material identification.

Figure 12B:
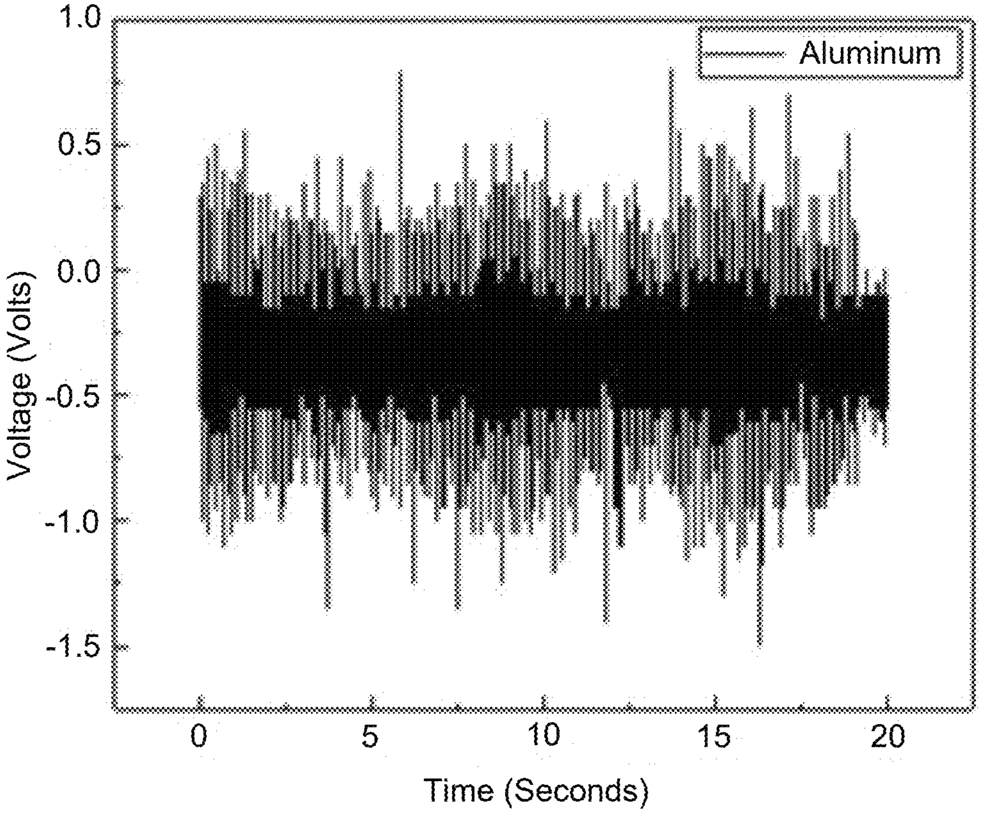
FIG. 12B: Shows a voltage versus time plot showing the measured output voltage of an all-polysaccharide (A/$G_{40}$/$NC_{80}$)-based single electrode TENG responding to aluminum, in accordance with embodiments of the disclosure.
Figure 12C:
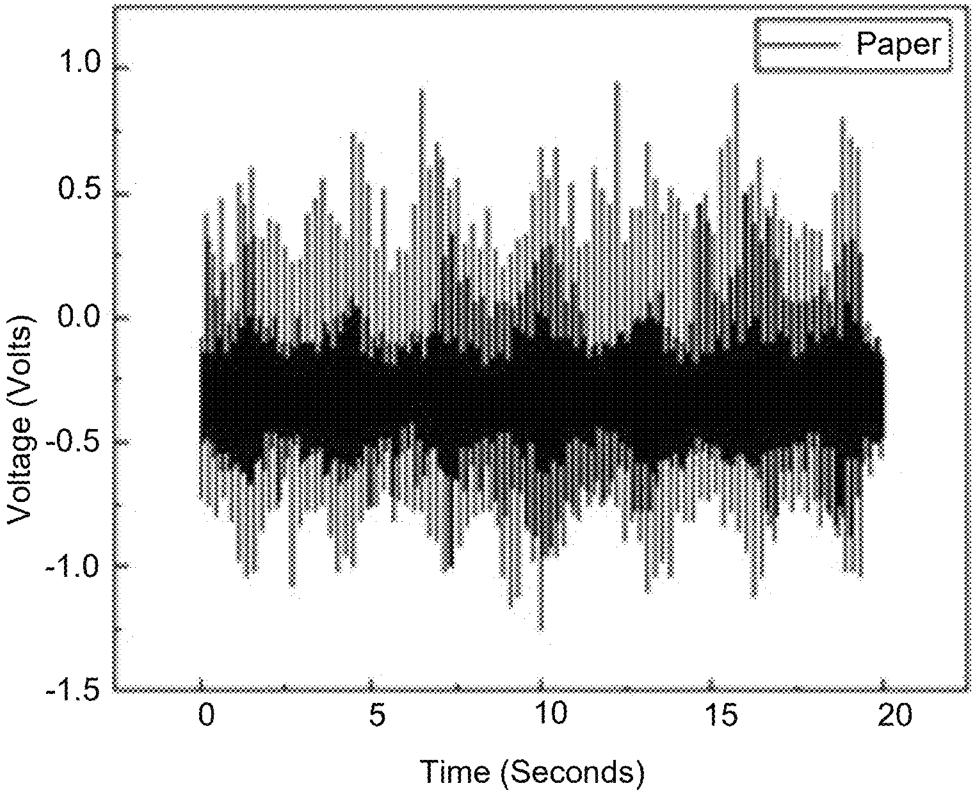
FIG. 12C: Shows a voltage versus time plot showing the measured output voltage of an all-polysaccharide (A/$G_{40}$/$NC_{80}$)-based single electrode TENG responding to paper, in accordance with embodiments of the disclosure.
Figure 12D:
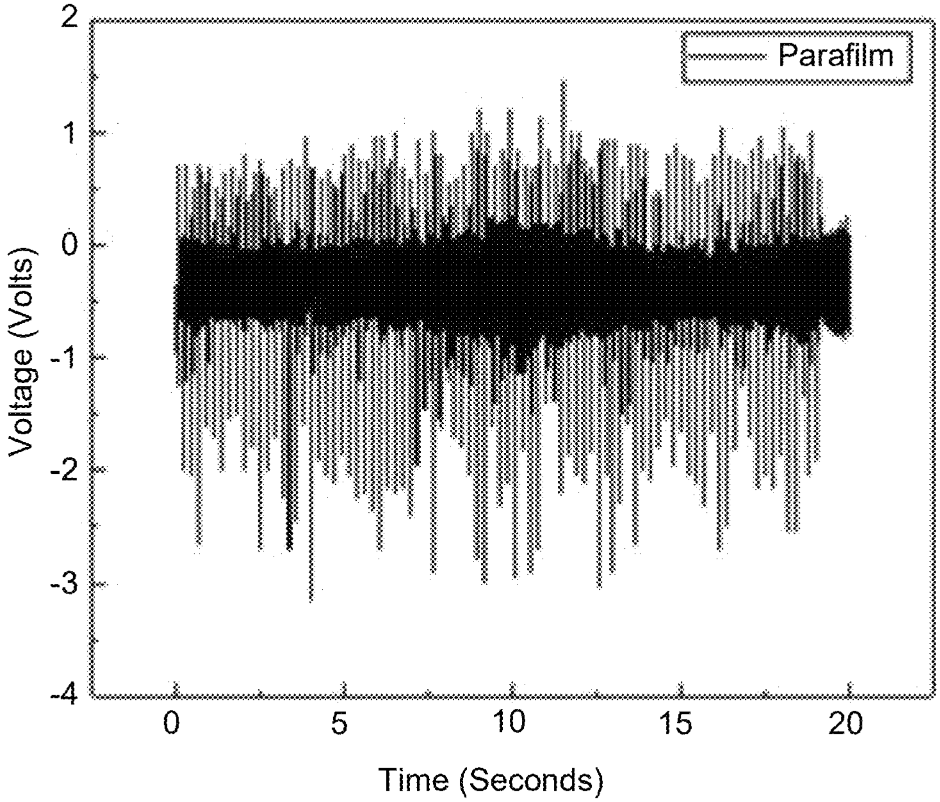
FIG. 12D: Shows a voltage versus time plot showing the measured output voltage of an all-polysaccharide (A/$G_{40}$/$NC_{80}$)-based single electrode TENG responding to parafilm, in accordance with embodiments of the disclosure.
Figure 12E:
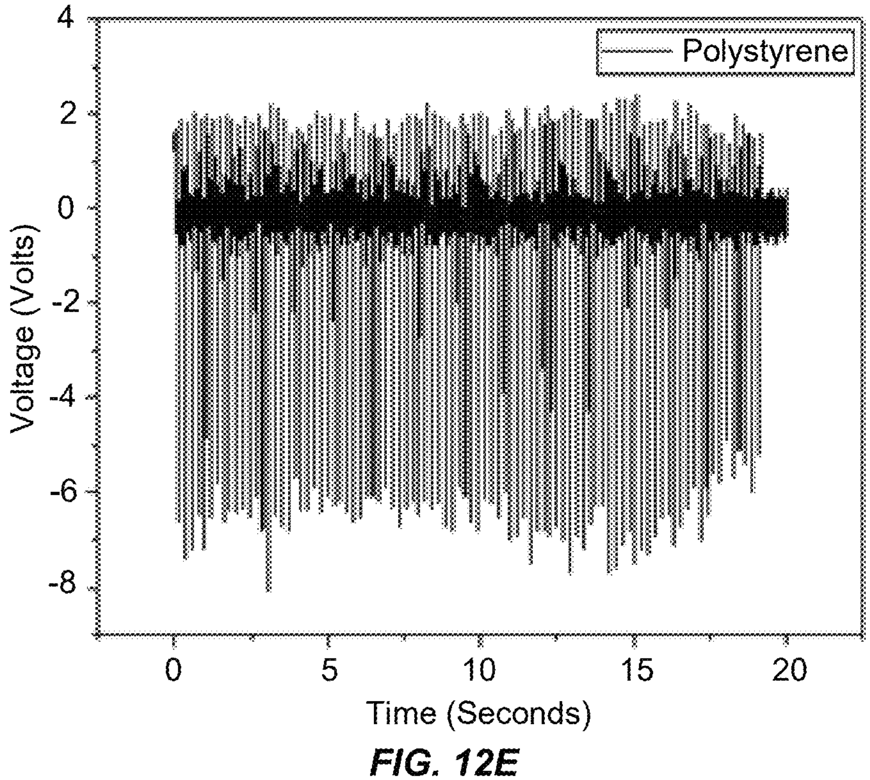
FIG. 12E: Shows a voltage versus time plot showing the measured output voltage of an all-polysaccharide (A/$G_{40}$/$NC_{80}$)-based single electrode TENG responding to polystyrene, in accordance with embodiments of the disclosure.
Figure 12F:
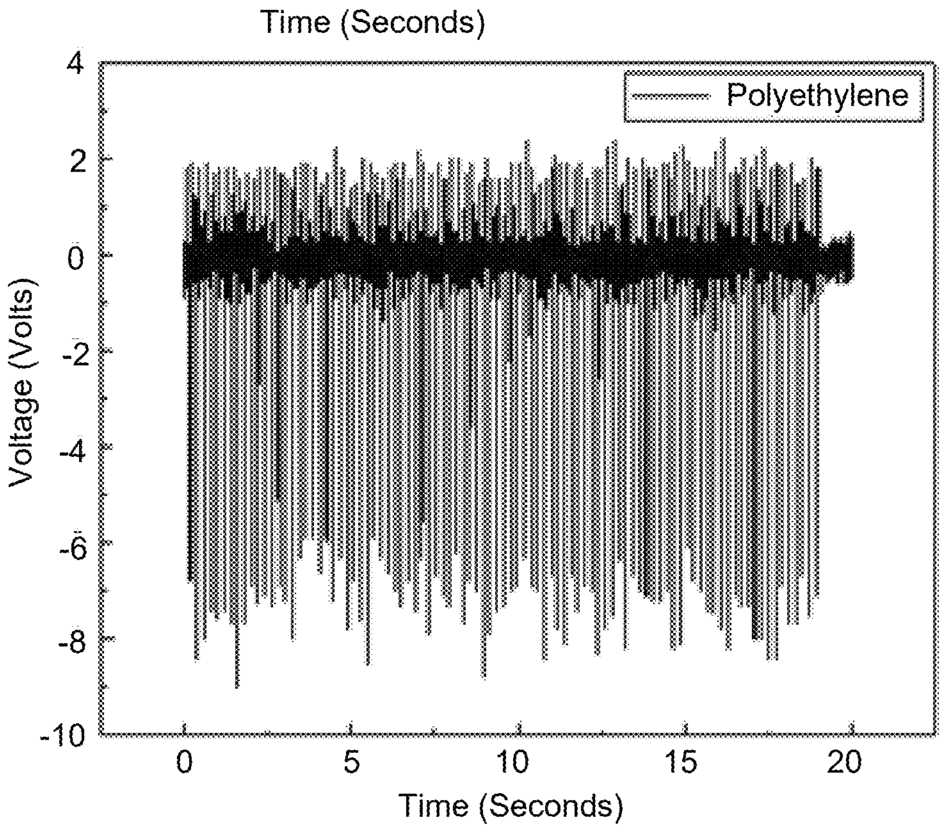
FIG. 12F: Shows a voltage versus time plot showing the measured output voltage of an all-polysaccharide (A/$G_{40}$/$NC_{80}$)-based single electrode TENG responding to polyethylene, in accordance with embodiments of the disclosure.
Figure 12G:
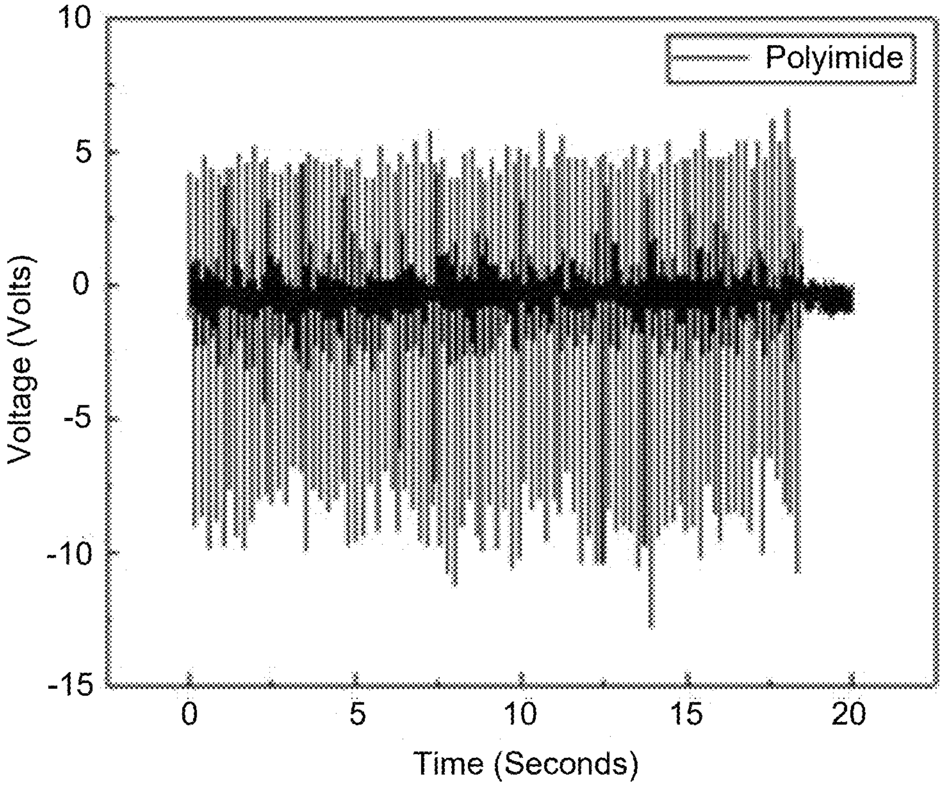
FIG. 12G: Shows a voltage versus time plot showing the measured output voltage of an all-polysaccharide (A/$G_{40}$/$NC_{80}$)-based single electrode TENG responding to polyimide, in accordance with embodiments of the disclosure.
Figure 12H:
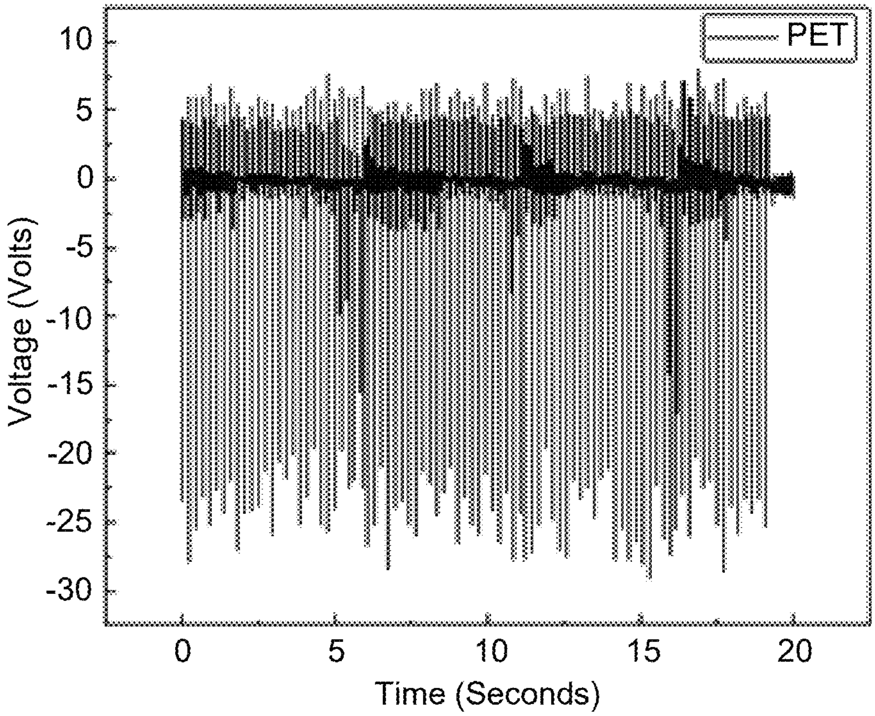
FIG. 12H: Shows a voltage versus time plot showing the measured output voltage of an all-polysaccharide (A/$G_{40}$/$NC_{80}$)-based single electrode TENG responding to PET, in accordance with embodiments of the disclosure.
Figure 12I:
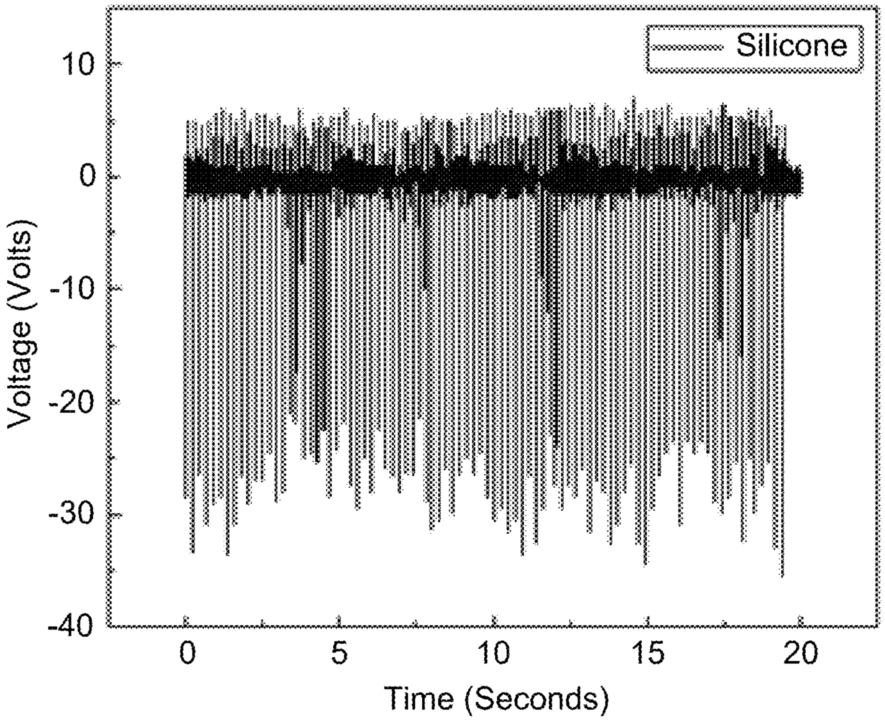
FIG. 12I: Shows a voltage versus time plot showing the measured output voltage of an all-polysaccharide (A/$G_{40}$/$NC_{80}$)-based single electrode TENG responding to silicone, in accordance with embodiments of the disclosure.
Figure 12J:
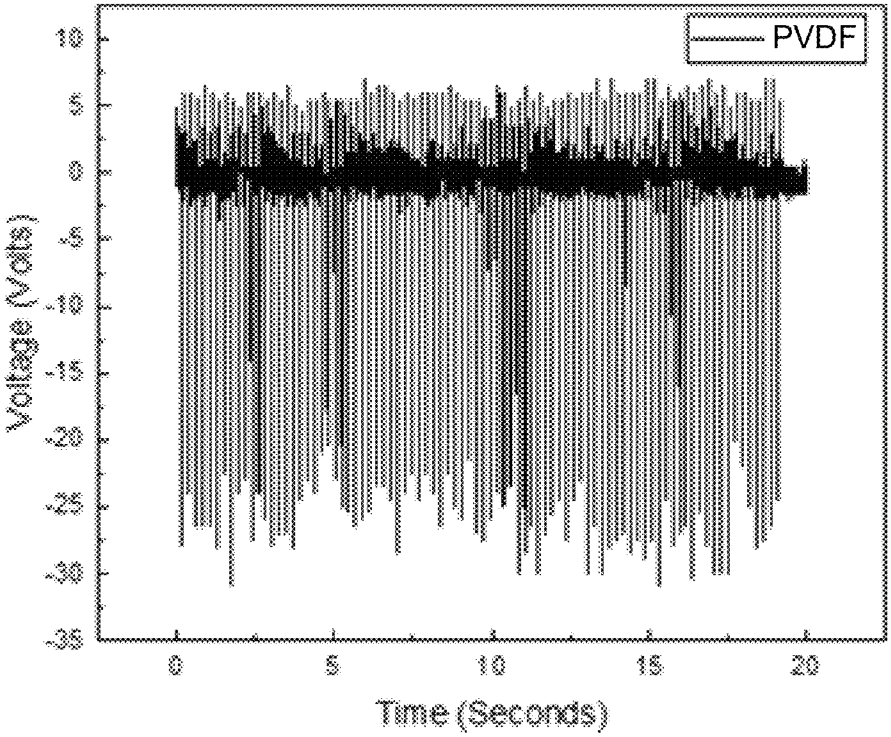
FIG. 12J: Shows a voltage versus time plot showing the measured output voltage of an all-polysaccharide (A/$G_{40}$/$NC_{80}$)-based single electrode TENG responding to PVDF, in accordance with embodiments of the disclosure.
Figure 12K:
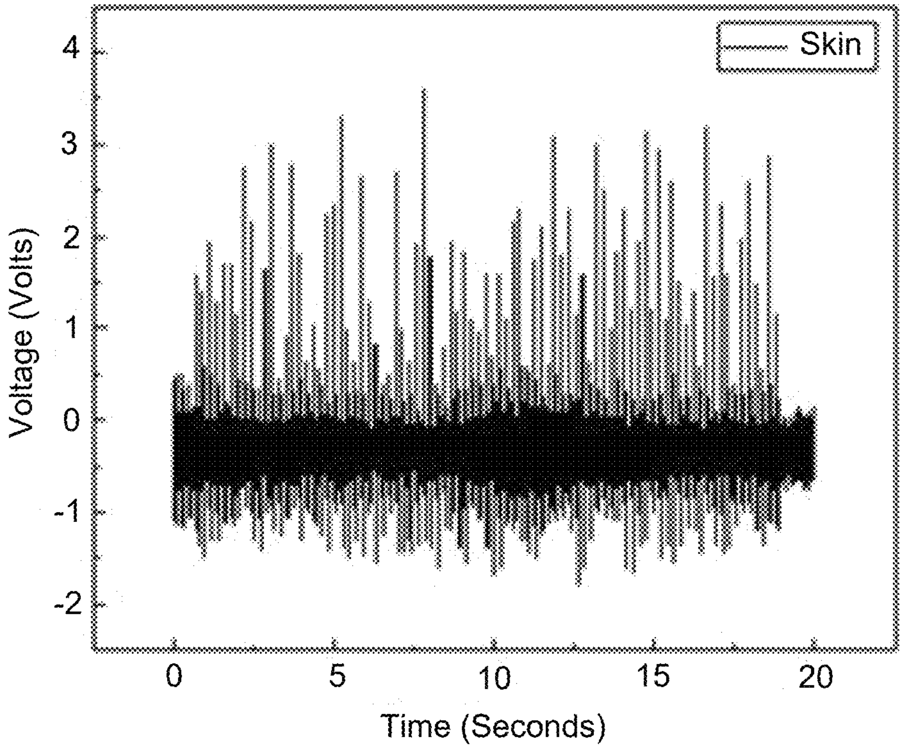
FIG. 12K: Shows a voltage versus time plot showing the measured output voltage of an all-polysaccharide (A/$G_{40}$/$NC_{80}$)-based single electrode TENG responding to skin, in accordance with embodiments of the disclosure.
Figure 12L:
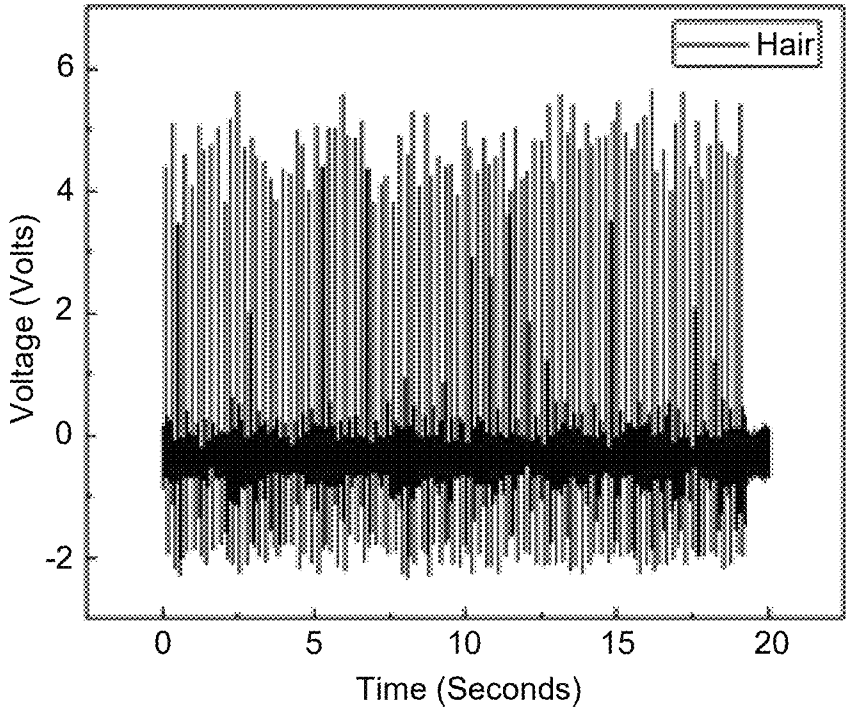
FIG. 12L: Shows a voltage versus time plot showing the measured output voltage of an all-polysaccharide (A/$G_{40}$/$NC_{80}$)-based single electrode TENG responding to hair, in accordance with embodiments of the disclosure.

For example, the device schematic and output voltage data of e-skin made of $AG_{40}NC_{80}$ all-polysaccharide based single electrode TENG in response to different positive and negative tribolayers (aluminum, paper, parafilm, polystyrene, polyethylene, polyimide, PET, silicone, PVDF, skin and hair) that are free of electrical contact is summarized in FIGS. 12B-12L. The recorded change in output voltage in response to various materials demonstrates the potential of ultrathin TENG-based e-skin for material identification. FIG. 12B shows the voltage output where the other frictional layer is aluminum. FIG. 12C shows the voltage output where the other frictional layer is paper. FIG. 12D shows the voltage output where the other frictional layer is parafilm. FIG. 12E shows the voltage output where the other frictional layer is polystyrene. FIG. 12F shows the voltage output where the other frictional layer is polyethylene. FIG. 12G shows the voltage output where the other frictional layer is polyimide. FIG. 12H shows the voltage output where the other frictional layer is PET. FIG. 12I shows the voltage output where the other frictional layer is silicone. FIG. 12J shows the voltage output where the other frictional layer is PVDF. FIG. 12K shows the voltage output where the other frictional layer is skin. FIG. 12L shows the voltage output where the other frictional layer is hair.

REFERENCES

H. G. Menge, N. D. Huynh, K. Choi, C. Cho, D. Choi, Y. T. Park, Body-Patchable, Antimicrobial, Encodable TENGs with Ultrathin, Free-Standing, Translucent Chitosan/Alginate/Silver Nanocomposite Multilayers, Advanced Functional Materials, 33 (2023) 2210571.

H. G. Menge, N. D. Huynh, H. J. Hwang, S. Han, D. Choi, Y. T. Park, Designable Skin-like Triboelectric Nanogenerators Using Layer-by-Layer Self-Assembled Polymeric Nanocomposites, ACS Energy Letters, 6 (2021) 2451-2459.

K. W. Klockars, B. L. Tardy, M. Borghei, A. Tripathi, L. G. Greca, O. J. Rojas, Effect of Anisotropy of Cellulose Nanocrystal Suspensions on Stratification, Domain Structure Formation, and Structural Colors, Biomacromolecules, 19 (2018) 2931-2943.

B. L. Tardy, B. D. Mattos, L. G. Greca, T. Kämäräinen, K. W. Klockars, O. J. Rojas, Tessellation of Chiral-Nematic Cellulose Nanocrystal Films by Microtemplating, Advanced Functional Materials, 29 (2019) 1808518.

B. D. Mattos, B. L. Tardy, L. G. Greca, T. Kämäräinen, W. Xiang, O. Cusola, W. L. E. Magalhães, O. J. Rojas, Nanofibrillar networks enable universal assembly of superstructured particle constructs, Science Advances, 6 eaaz7328.

B. D. Mattos, B. L. Tardy, O. J. Rojas, Accounting for Substrate Interactions in the Measurement of the Dimensions of Cellulose Nanofibrils, Biomacromolecules, 20 (2019) 2657-2665.

M. S. Reid, M. Villalobos, E. D. Cranston, Benchmarking Cellulose Nanocrystals: From the Laboratory to Industrial Production, Langmuir, 33 (2017) 1583-1598.

O. I. V. Luotonen, L. G. Greca, G. Nyström, J. Guo, J. J. Richardson, O. J. Rojas, B. L. Tardy, Benchmarking supramolecular adhesive behavior of nanocelluloses, cellulose derivatives and proteins, Carbohydrate polymers, 292 (2022) 119681.

K. K. Jena, B. Fatma, S. S. Arya, S. M. Alhassan, V. Chan, A. M. Pappa, C. Pitsalidis, High Performance Flexible Triboelectric Nanogenerators Using Bio-Derived Films Made of Siloxane-Modified Castor Oil, J. of Mater. Chem. A, 2024, 12, 8340-8349.

STATEMENTS REGARDING INCORPORATION BY REFERENCE AND VARIATIONS

All references throughout this application, for example patent documents, including issued or granted patents or equivalents and patent application publications, and non-patent literature documents or other source material are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

Every formulation or combination of components described or exemplified can be used to practice the invention, unless otherwise stated. Specific names of materials are intended to be exemplary, as it is known that one of ordinary skill in the art can name the same material differently. It will be appreciated that methods, device elements, starting materials, and methods of making other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a Voltage range, a layering range, or a composition range, all intermediate ranges and subranges, as well as all individual values included in the ranges given are intended to be included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by examples, embodiments, and optional features, modification and variation of the concepts herein disclosed may be resorted to by those skilled in the art, and that such modifications and variations are considered to be within the scope of this invention as defined by the appended claims.

What is claimed is:

1. A triboelectric nanogenerator comprising:

a single substrate layer; wherein the single substrate layer is an agar layer;

a single electrode layer; and a single tribolayer;

wherein the single electrode layer and the single tribolayer are bonded by hydrogen bonds.

2. The triboelectric nanogenerator of claim 1, wherein the single substrate layer is the base layer, the single electrode layer is the middle layer, and the single tribolayer is the surface layer.

3. The triboelectric nanogenerator of claim 1, wherein the single tribolayer has a thickness from 1.5 to 20 μm.

4. The triboelectric nanogenerator of claim 1, wherein a graphene layer has a thickness from 3 to 8 μm.

5. The triboelectric nanogenerator of claim 1, wherein the device output voltage is greater than 500 V.

6. A method of making the triboelectric nanogenerator of claim 1, comprising:

a) spray-coating a substrate with an electrode layer; and b) spray-coating the electrode layer with a tribolayer, wherein the spray-coating of the electrode layer does not exceed 80 passes and wherein the spray-coating of the tribolayer does not exceed 240 passes.

7. A biopolymer-based triboelectric nanogenerator, comprising:

a first component having a positive tribolayer; and a second component having a negative tribolayer, wherein each of the first component and the second component comprise:

a substrate layer;

an electrode layer; and a tribolayer;

wherein the electrode layer and the tribolayer of the first component are bonded by hydrogen bonds.

8. The biopolymer-based triboelectric nanogenerator of claim 7, wherein for each of the first component and the second component the substrate layer is the base layer, the electrode layer is the middle layer, and the tribolayer is the surface layer.

9. The biopolymer-based triboelectric nanogenerator of claim 7, where the first component is a triboelectric component.

10. The triboelectric component of claim 9, wherein:

(i) the substrate layer is an agar layer;

(ii) the electrode layer is a graphene layer; and (iii) the tribolayer is a nanocellulose layer.

11. The triboelectric component of claim 10, wherein the nanocellulose layer is a never-dried cellulose nanocrystal (NDCNC), a cellulose nanofibril (CNF), a spray-dried cellulose nanocrystal (SDCNC), or a tempo-oxidized cellulose nanofibril (TOCNF).

12. The triboelectric component of claim 10, wherein the nanocellulose layer is never-dried cellulose nanocrystal (NDCNC).

13. The triboelectric component of claim 10, wherein the graphene layer has a thickness from 3 to 8 μm.

14. The biopolymer-based triboelectric nanogenerator of claim 7, wherein the second component comprises:

a poly (ethylene terephthalate) (PET) substrate layer;

a copper (Cu) tape electrode layer; and a polyimide (PI) or castor oil (CO) tribolayer.

15. The triboelectric component of claim 7, wherein the tribolayer has a thickness from 1.5 to 20 μm.

16. The triboelectric component of claim 7, wherein the device output voltage is over 500 V.

17. A triboelectric nanogenerator comprising:

a single substrate layer;

a single electrode layer; and a single tribolayer; wherein the single tribolayer is a nanocellulose layer and wherein the nanocellulose layer is a never-dried cellulose nanocrystal (NDCNC), a cellulose nanofibril (CNF), a spray-dried cellulose nanocrystal (SDCNC), or a tempo-oxidized cellulose nanofibril (TOCNF);

wherein the single electrode layer and the single tribolayer are bonded by hydrogen bonds.

18. The triboelectric nanogenerator of claim 17, wherein the single tribolayer has a thickness from 1.5 to 20 μm.

19. The triboelectric nanogenerator of claim 17, wherein a graphene layer has a thickness from 3 to 8 μm.

20. The triboelectric nanogenerator of claim 17, wherein the device output voltage is greater than 500 V.

21. A method of making the triboelectric nanogenerator of claim 17, comprising:

a) spray-coating a substrate with an electrode layer; and b) spray-coating the electrode layer with a tribolayer, wherein the spray-coating of the electrode layer does not exceed 80 passes and wherein the spray-coating of the tribolayer does not exceed 240 passes.

* * * * *